US011287894B2

(12) United States Patent
Yan et al.

(10) Patent No.: US 11,287,894 B2
(45) Date of Patent: Mar. 29, 2022

(54) UTILIZING A TOUCHPOINT ATTRIBUTION ATTENTION NEURAL NETWORK TO IDENTIFY SIGNIFICANT TOUCHPOINTS AND MEASURE TOUCHPOINT CONTRIBUTION IN MULTICHANNEL, MULTI-TOUCH DIGITAL CONTENT CAMPAIGNS

(71) Applicant: Adobe Inc., San Jose, CA (US)

(72) Inventors: Zhenyu Yan, Cupertino, CA (US); Fnu Arava Venkata Kesava Sai Kumar, Cupertino, CA (US); Chen Dong, San Matteo, CA (US); Abhishek Pani, Sunnyvale, CA (US); Ning Li, Seattle, WA (US)

(73) Assignee: Adobe Inc., San Jose, CA (US)

( * ) Notice: Subject to any disclaimer, the term of this patent is extended or adjusted under 35 U.S.C. 154(b) by 153 days.

(21) Appl. No.: 15/917,052

(22) Filed: Mar. 9, 2018

(65) Prior Publication Data
US 2019/0278378 A1 Sep. 12, 2019

(51) Int. Cl.
*G06Q 30/00* (2012.01)
*G06F 3/01* (2006.01)
(Continued)

(52) U.S. Cl.
CPC ............ *G06F 3/017* (2013.01); *G06F 3/0481* (2013.01); *G06F 3/0484* (2013.01); *G06N 3/08* (2013.01); *H04L 67/22* (2013.01)

(58) Field of Classification Search
CPC ...... G06F 3/017; G06F 3/0484; G06F 3/0481; G06F 3/04883; G06N 3/08; G06N 3/0445;
(Continued)

(56) References Cited

U.S. PATENT DOCUMENTS

| 9,183,562 | B2 * | 11/2015 | Chittilappilly | ......... G06Q 30/02 |
| 2013/0332264 | A1 * | 12/2013 | Chittilappilly | ......... G06Q 30/02 |
| | | | | 705/14.45 |

(Continued)

OTHER PUBLICATIONS

"Attributing Conversions in a Multichannel Online Marketing Environment"; Alice Li, P.K. Kannan; 2015.*
(Continued)

*Primary Examiner* — Yehdega Retta
(74) *Attorney, Agent, or Firm* — Keller Jolley Preece

(57) ABSTRACT

The present disclosure relates to systems, non-transitory computer-readable media, and methods for generating and utilizing a touchpoint attribution attention neural network to identify and measure performance of touchpoints in digital content campaigns. For example, a deep learning attribution system trains a touchpoint attribution attention neural network using touchpoint sequences, which include user interactions with content via one or more digital media channels. In one or more embodiments, the deep learning attribution system utilizes the trained touchpoint attribution attention neural network to determine touchpoint attributions of touchpoints in a target touchpoint sequence. In addition, the deep learning attribution system can utilize the trained touchpoint attribution attention neural network to generate conversion predictions for target touchpoint sequences and to provide targeted digital content over specific digital media channels to client devices of individual users.

20 Claims, 15 Drawing Sheets

(51) Int. Cl.
  *G06N 3/08* (2006.01)
  *G06F 3/0484* (2022.01)
  *H04L 67/50* (2022.01)
  *G06F 3/0481* (2022.01)

(58) Field of Classification Search
  CPC ...... G06N 3/084; G06N 3/0481; H04L 67/22; H04L 51/18; H04L 51/20; H04L 51/30; G06Q 30/0242; G06Q 30/0255; G06Q 30/0254
  See application file for complete search history.

(56) References Cited

U.S. PATENT DOCUMENTS

| | | | |
|---|---|---|---|
| 2016/0210656 A1* | 7/2016 | Chittilappilly | G06Q 30/0246 |
| 2016/0210657 A1* | 7/2016 | Chittilappilly | G06Q 30/0246 |
| 2017/0091810 A1* | 3/2017 | McGovern | G06Q 30/0246 |
| 2017/0124432 A1* | 5/2017 | Chen | G06N 3/0454 |
| 2018/0075367 A1* | 3/2018 | Yates | G06Q 30/0269 |

OTHER PUBLICATIONS

"Deep LSTM with Attention for Message-level and Topic-based Sentiment Analysis"; Christos Baziotis et al.; 2017.*
"CNN-RNN: A unified framework for multi-label image classification"; Jiang Wang et al.; Apr. 15, 2016.*
"Digital Attribution Primer 2.0", 2016 Interactive Advertising Bureau Attribution Primer 2.0.*
W. Ji, Y. Wei, and X. Wang. Additional multi-touch attribution for online advertising. In Proceedings of the Thirty-first AAAI Conference on Artificial Intelligence (AAAI), www.aaai.org, 2017.
I. Goodfellow, Y. Bengio, and A. Courville. Deep Learning. MIT Press, 2016. http://www.deeplearningbook.org.
Y. Bengio, A. Courville, and P. Vincent. Representation learning: A review and new perspectives. IEEE transactions on pattern analysis and machine intelligence, 35(8):1798-1828, 2013.
D. Bahdanau, K. Cho, and Y. Bengio. Neural machine translation by jointly learning to align and translate. arXiv preprint arXiv:1409.0473, 2014.
X. Shao and L. Li. Data-driven multi-touch attribution models. In Proceedings of the 17th ACM SIGKDD international conference on Knowledge discovery and data mining, pp. 258-264. ACM, 2011.
B. Dalessandro, C. Perlich, O. Stitelman, and F. Provost. Causally motivated attribution for online advertising. In Proceedings of the Sixth International Workshop on DataMining for Online Advertising and Internet Economy, p. 7. ACM, 2012.
P. Wang, Y. Liu, M. Meytlis, J. Yang, H.-Y. Tsao, and P. Huang. An effective framework for online advertising effectiveness measurement and comparison. In Proceedings of WSDM. ACM, 2014.
Y. Zhang, Y. Wei, and J. Ren. Multi-touch attribution in online advertising with survival theory. In IEEE International Conference on In Data Mining (ICDM), pp. 687-696. IEEE, 2014.
W. Ji, X. Wang, and D. Zhang. A probabilistic multitouch attribution model for online advertising. In Proceedings of the 25th ACM International on Conference on Information and Knowledge Management, pp. 1373-1382. ACM, 2016.
L. Xu, J.A. Duan, and A.B. Whinston. Path to purchase: A mutually exciting point process model for online advertising and conversion, Management Science vol. 60, No. 6, pp. 1392-1412, 2014.
V. Abhishek, P.S. Fader, and K. Hosanagar. Media exposure through the funnel: A model of multi-stage attribution. Soc. Sci. Res. Netw.Electron. J., pp. 1-45, 2012.
V. Mnih, N. Hees, A. Graves, and K. Kavukcuoglu. Recurrent models of visual attention. NIPS, 2014.
H. Larochelle and G.E. Hinton. Learning to combine foveal glimpses with a third-order boltzmann machine. In Advances in neural information processing systems, pp. 1243-1251, 2010.
S. Hochreiter and J. Schmidhuber. Long short-term memory. Neural computation, 9(8):1735-1780, 1997.
Z. Yang, D. Yang, C. Dyer, X. He, A.J. Smola, and E.H. Hovy. Hierarchical attention networks for document classification. In HLT-NAACL, pp. 1480-1489, 2016.
D. A. Wooff and J. M. Anderson. Time-weighted multi-touch attribution and channel relevance in the customer journey to online purchase. J. Stat. Theory Pract, 2015.
P.R. Rosenbaum and D.B. Rubin. Reducing bias in observational studies using subclassification on the propensity score. Journal of the American statistical Association, 79(387):516-524, 1984.
E. Anderl, E. Becker, F. Wangenheim, and J.H. Schumann. Mapping the customer journey; a graph based framework for online attribution modeling. 2014.
M. Abadi, A. Agarwal, P. Barham, E. Brevdo, Z. Chen, C. Citro, G.S. Corrado, A. Davis, J. Dean, M. Devin, et al. Tensorflow: Large-scale machine learning on heterogeneous distributed systems. arXiv preprint arXiv:1603.04467, 2016.
D. Kingma and J. Ba. Adam: A method for stochastic optimization. arXiv preprint arXiv:1412.6980, 2014.
H Li and P.K. Kannan. Attributing conversions in a multichannel online marketing environment: An empirical model and a field experiment. J.Mark.Res., 51:40-56, 2013.

* cited by examiner

UTILIZING A TOUCHPOINT ATTRIBUTION ATTENTION NEURAL NETWORK TO IDENTIFY SIGNIFICANT TOUCHPOINTS AND MEASURE TOUCHPOINT CONTRIBUTION IN MULTICHANNEL, MULTI-TOUCH DIGITAL CONTENT CAMPAIGNS

BACKGROUND

Advancements in computer and communication technologies have resulted in improved digital content dissemination systems for generating and providing digital content to client devices across computing networks. For example, conventional digital content dissemination systems can execute large-scale digital content campaigns to provide customized digital content to client devices of individual users in real-time (e.g., as user client devices interact with digital assets, such as websites hosted on remote servers). For example, a company can provide digital content to potential customers via instant messages, emails, digital alerts, advertisement displays, impressions, notification, search results, or texts.

Despite these and other advantages, however, conventional digital content dissemination systems still have a number of technical shortcomings. For example, conventional digital content dissemination systems are often inaccurate and imprecise. To illustrate, as just mentioned, conventional digital content dissemination systems often provide customized digital content through a variety of different digital media channels. Conventional digital content dissemination systems often inaccurately select digital media channels for providing digital content to client devices of individual users (e.g., media channels that users or user client devices are unlikely to access or utilize). Indeed, because digital content is often provided at multiple different touchpoints, conventional digital content dissemination systems are often unable to accurately identify or predict the particular digital media channels for digital content that result in users utilizing, interacting with, and applying the digital content via their client devices. For example, conventional digital content dissemination systems lack the ability to accurately attribute or predict the contribution of one or more touchpoints with digital content via different media channels that lead to a particular user action at a client device.

In addition to these inaccuracies, conventional digital content dissemination systems are also inefficient. Indeed, because conventional digital content dissemination systems cannot accurately or precisely determine or predict contribution of individual touchpoints for particular users, these systems utilize significant computing resources in generating, transmitting, and monitoring irrelevant digital content provided via improper media channels that are unlikely to result in client devices utilizing, accessing, or applying the digital content. For example, in an effort to satisfy campaign parameters (e.g., achieve a target reach), some conventional digital content dissemination systems will continue to expend computing resources in providing digital content to client devices via computer networks until achieving a desired result. Because of the inaccuracy of conventional digital content dissemination systems, in such circumstances, conventional systems can quickly multiply the computing resources required to execute a digital content campaign.

Furthermore, conventional digital content dissemination systems are also inflexible. For instance, some digital content dissemination systems include rigid hardware and/or software solutions for determining attribution of digital content touchpoints via one or more digital media channels in relation to conduct at particular client devices. For example, some conventional digital content dissemination systems utilize first touch attribution, last touch attribution, equal linear weight attribution, strict time decayed attribution, and position-based attribution. However, these methods apply rigid, pre-determined, non-adaptable rules which often led to ignoring one or more relevant factors (e.g., fluid, complex interactions between digital media channels over time, user characteristics and past user behavior, and/or time lapse between events). Indeed, the inaccuracies discussed above often result from the rigid and inflexible nature of conventional systems.

These along with additional problems and issues exist with regard to conventional digital content dissemination systems.

BRIEF SUMMARY

Embodiments of the present disclosure provide benefits and/or solve one or more of the foregoing or other problems in the art with systems, non-transitory computer-readable media, and methods for generating and utilizing a touchpoint attribution attention neural network to identify significant touchpoints and/or measure performance of touchpoints in digital content campaigns (i.e., campaigns that utilize multiple media channels and multiple touchpoints to provide digital content to user client devices). For instance, the disclosed systems can train a touchpoint attribution attention neural network (a deep neural network that includes an attention layer) to predict if a series of digital touchpoints will lead to particular conduct at a user client device (e.g., a conversion). Moreover, the disclosed systems can further train the touchpoint attribution attention neural network utilizing a time-decay parameter (to account for reduced influence over time) and a user bias control machine-learning model (to account for bias effects). The disclosed systems can then utilize the trained touchpoint attribution attention neural network to accurately, efficiently, and flexibly measure influence of particular media channels in a digital content campaign, select digital media channels, and/or predict conduct resulting from one or more potential touchpoints.

To briefly demonstrate, in one or more embodiments, the disclosed systems identify a set of digital training touchpoints and a set of digital training conversions corresponding to a set of users. The disclosed systems can then generate a plurality of training touchpoint paths, where each training touchpoint path is specific to a particular user and reflects a digital training touchpoint sequence and a training conversion indication. The disclosed systems can train the touchpoint attributional neural network based on the plurality of training touchpoint paths. Specifically, in one or more embodiments, the disclosed systems train an attention layer of the touchpoint attributional neural network to determine attention weights for each touchpoint in each training touchpoint sequence. Once trained, the disclosed systems can utilize the trained touchpoint attributional neural network to analyze a target touchpoint sequence and determine a specific touchpoint attribution. Moreover, the disclosed systems can utilize the trained touchpoint attribution neural network to select future digital media channels and/or generate conversion predictions in relation to a digital content campaign.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
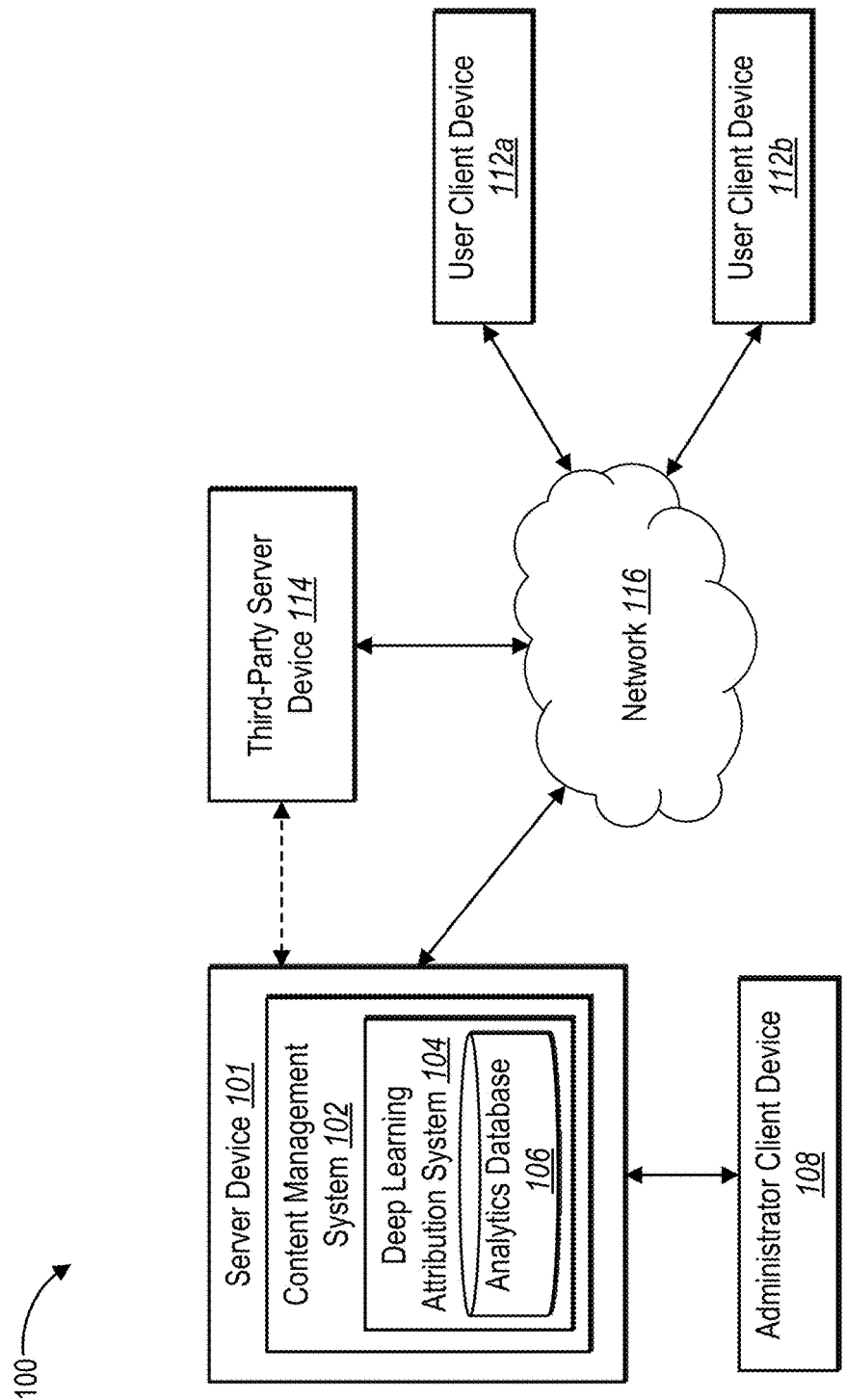
FIG. 1 illustrates a diagram of an environment in which a deep learning attribution system can operate in accordance with one or more embodiments.

This disclosure describes one or more embodiments of a deep learning attribution system that generates and utilizes a touchpoint attribution attention neural network to identify significant touchpoints and/or measure performance of touchpoints in digital content campaigns that utilize multiple media channels and touchpoints to provide digital content to user client devices. For instance, in one or more embodiments, the deep learning attribution system trains a touchpoint attribution attention neural network (that includes an encoding layer, an LSTM layer, and a touchpoint attention layer) based on training touchpoint paths. Specifically, in one or more embodiments, the deep learning attribution system trains the touchpoint attribution attention neural network utilizing a time-decay parameter and a jointly trained user bias control machine-learning model. In this manner, the deep learning attribution system can generate and utilize a touchpoint attribution attention neural network to efficiently and accurately generate accurate touchpoint attributions for a digital content campaign as well as generate conversion predictions for future touchpoints in digital content campaigns. Moreover, by utilizing a trained touchpoint attribution attention neural network the deep learning attribution system can flexibly model interactions between different media channels, temporal effects, user characteristics, and control variables.

To illustrate, in one or more embodiments, deep learning attribution system generates training touchpoint paths, where each training touchpoint path is specific to a particular user and reflects a digital training touchpoint sequence and a training conversion indication. The deep learning attribution system can then train the touchpoint attributional neural network based on the training touchpoint paths. Specifically, the deep learning attribution system can tune an attribution layer of the touchpoint attribution attention neural network to analyze latent features of touchpoints in the training touchpoint sequences to determine attention weights for the touchpoints. The deep learning attribution system can then utilize the trained touchpoint attributional neural network to analyze a target touchpoint sequence and determine a specific touchpoint attribution for a target touchpoint within the touchpoint sequence. Moreover, in one or more embodiments, the deep learning attribution systems utilize the trained touchpoint attribution neural network to generate conversion predictions and select future digital media channels in relation to anticipated touchpoints in a digital content campaign.

As mentioned above, the deep learning attribution system can generate and utilize training touchpoint paths to train a touchpoint attribution attention neural network. In particular, in one or more embodiments, the deep learning attribution system generates a touchpoint path that includes a sequence of touchpoints and a conversion indicator. For example, the deep learning attribution system can analyze digital interactions (i.e., touchpoints) between one or more client devices of a user and digital content from a publisher and arrange the touchpoints in sequential order to generate a touchpoint path. Moreover, the deep learning attribution system can monitor user conduct to determine if (and when) a user engaged in particular conduct via one or more client devices (e.g., a conversion). In this manner, the deep learning attribution system can generate a training touchpoint path with a corresponding conversion indicator.

Moreover, as mentioned above, the deep learning attribution system can utilize training touchpoint paths to train a touchpoint attribution attention neural network. For example, in one or more embodiments, the touchpoint attribution attention neural network can analyze features of the training touchpoint paths (e.g., number, type, and order of touchpoints included in the training touchpoint path) to generate attention weights for each touchpoint. Utilizing the attention weights for each touchpoint, the touchpoint attribution neural network can generate a conversion probability for the touchpoint path.

The deep learning attribution system can then utilize a supervisory learning approach and tune the touchpoint attribution attention neural network to more accurately generate attention weights for touchpoints and more accurate conversion predictions. Specifically, in one or more embodiments, the touchpoint attribution attention neural network includes a loss layer that determines a training loss. For example, the deep learning attribution system can compare a conversion prediction to a conversion indicator included in a training touchpoint path to determine training loss. The deep learning attribution system can then utilize the training loss in relation to layers of the touchpoint attribution attention neural network to tune parameters of the touchpoint attribution attention neural network.

The deep learning attribution system can train various layers of the touchpoint attribution attention neural network. For example, in various embodiments, the touchpoint attribution attention neural network includes an embedding layer, a recurrent neural network (RNN)/long short-term memory (LSTM) layer, an attention layer, and a classification layer. As a brief introduction to these layers, the embedding layer can receive a sequence of touchpoints as encoded data and quantify and categorize hidden contextual similarities between the touchpoints. The LSTM layer can incorporate the contextual information for each touchpoint with the historical information of previous touchpoints in the touchpoint sequence. The attention layer can determine attention weights for each touchpoint. In addition, the attention layer can create a touchpoint sequence representation based on corresponding attention weights. The classification layer predicts the probability (e.g., a conversion prediction) that the touchpoint sequence results in conversion based on the attention weights.

As mentioned, in some embodiments, the deep learning attribution system further trains the touchpoint attribution attention neural network based on the time between each touchpoint in a touchpoint sequence and a resulting conversion. For example, the deep learning attribution system can include a time-decay parameter into the attention layer of the touchpoint attribution attention neural network that causes attention weights to reflect the elapsed time between the time of conversion (or non-conversion) and touchpoints in a touchpoint sequence.

To reduce media effect biases between user-related attributes and characteristics, the touchpoint attribution attention neural network can also include a user bias control machine-learning model. For example, the deep learning attribution system can include a user bias control machine-learning model that receives time-independent user control variables (e.g., age, gender, location) and provides a user bias control representation to the classification layer in the touchpoint attribution attention neural network. Based on attention weights from the attention layer and the user bias control representation from the user bias control machine-learning model, the deep learning attribution system can jointly train the embedding, LSTM, and attention layers with layers of the user bias control model to determine conversion predictions of touchpoint sequences.

Once trained, in one or more embodiments, the deep learning attribution system utilizes the touchpoint attribution attention neural network to determine touchpoint attributions of target touchpoint sequences. For example, given a target touchpoint sequence that resulted in a conversion, the trained touchpoint attribution attention neural network can generate an accurate measure of relative attribution for each touchpoint in the target sequence that influenced the conversion. In some embodiments, the deep learning attribution system aggregates and analyzes multiple target touchpoint sequences (e.g., across a campaign) and provides a graphical representation of the cumulative touchpoint attribution results to an administrator client device.

The deep learning attribution system can also utilize the trained touchpoint attribution attention neural network to generate a conversion prediction for providing digital content to a client device of a target user. For example, the trained touchpoint attribution attention neural network can select a media channel (e.g., potential touchpoint) to add to the target touchpoint sequence for the target user. Specifically, the deep learning attribution system can utilize the trained touchpoint attribution attention neural network to analyze multiple media channels, generate multiple conversion predictions, and determine the media channel with the highest conversion prediction in relation to a target user. The deep learning attribution system can then provide additional digital content (e.g., directly or indirectly) to a client device of the target user via the media channel with the highest conversion prediction The deep learning attribution system provides many advantages and benefits over conventional systems and methods. For example, by training and utilizing a touchpoint attribution attention neural network, the deep learning attribution system can more accurately determine the effects, weights, and influences resulting from the complex interactions between touchpoints in a touchpoint sequence. Specifically, the deep learning attribution system can utilize attention weights from the touchpoint attribution attention neural network to more accurately identify relative attribution levels for individual touchpoints within a touchpoint sequence. Moreover, the deep learning attribution system can more accurately predict conversion probabilities and select more accurate digital media channels for providing digital content to client devices of individual users. Indeed, as further described below in relations to Tables 1-3, the deep learning attribution system outperforms conventional systems in head-to-head evaluations with respect to determining touchpoint attributions as well as accuracy in providing conversion predictions.

The deep learning attribution system also improves efficiency. Indeed, by more accurately and precisely identifying digital media channels for providing digital content, the deep learning attribution system can reduce computing resources required to generate, distribute, and monitor unnecessary digital content. To illustrate, the deep learning attribution system can result in fewer required touchpoints through fewer media channels resulting in less storage and processing power to create, disseminate, and monitor user interactions with digital content. The deep learning attribution system can also reduce unnecessary computer resources utilized by client devices in receiving, accessing, and storing digital content.

Moreover, the deep learning attribution system also improves flexibility over conventional systems. As mentioned above, conventional systems primarily use models limited to predetermined and non-adaptable rules to determine touchpoint attributions, which fails to accurately reflect the influence of each interaction. The deep learning attribution system can generate and utilize a touchpoint attribution attention neural network that flexibly analyzes a variety of different features, factors, and characteristics dynamically learned based on training touchpoint sequences, including, complex interactions between different digital media channels over time, user characteristics and past user behavior, and time lapse between events.

As an additional advantage, the deep learning attribution system can generate and provide unique graphical user interfaces that further improve efficiency and flexibility relative to conventional systems. For instance, the deep learning attribution system can generate and provide graphical user interfaces that indicate touchpoint attributions for one or more touchpoint sequences, touchpoint attributions over time, and/or the effects of time lag associated with touchpoints. By utilizing these graphical user interfaces, the deep learning attribution system can reduce time required to identify significant features in selecting media channels and determining driving factors in user interaction with digital content transmitted to client devices.

As illustrated by the foregoing discussion, the present disclosure utilizes a variety of terms to describe features and advantages of the deep learning attribution system. Additional detail is now provided regarding the meaning of such terms. For example, as used herein, the term "digital touchpoint" (or "digital media touchpoint" or simply "touchpoint") refers to a point of contact between a user and an entity (e.g., a company, business, or individual). In particular, the term "touchpoint" refers to an interaction between the user and the entity with respect to digital content corresponding to a product or service offered by the entity (for ease of explanation, the term product hereafter refers to both products and services and includes subscriptions, bundles, and on-demand/one-time purchasable products). Touchpoint interactions primarily occur via one or more digital media channels (e.g., network-based digital distribution channels). For instance, a touchpoint is created when a user interacts with the entity via an electronic message, a web browser, or an Internet-enabled application. Examples of digital content that are associated with touchpoints include digital advertisements, free software trials, and website visits. Further, example digital media channels include email, social media, organic search, paid search, and, in-app notifications.

In addition, one or more touchpoints can form a touchpoint sequence. As used herein, the term "digital touchpoint sequence" (or simply "touchpoint sequence") refers to one or more touchpoints between a given user and a given entity. For instance, the term "touchpoint sequence" includes multiple touchpoints between the user and the entity in a particular order, such as the order of occurrence. A touchpoint sequence can belong to a training dataset (e.g., a training touchpoint sequence) or target data (e.g., a target touchpoint sequence), as described below. As used herein, the term "training" is used to describe information, data, individuals, or objects utilized to train a neural network, while the term "target" is used to describe information, data, individuals, or objects analyzed by a trained neural network (e.g., a target touchpoint sequence analyzed by a trained neural network to generate a conversion prediction for a target user). In some embodiments, a touchpoint sequence is further limited to touchpoints between the user and the entity with respect to a given product offered by the entity. Additionally, or alternatively, a touchpoint sequence can be limited to a time window (e.g., a day, week, month, year, etc.).

The term "touchpoint path" (or "touchpoint conversion path" or simply "touchpoint path"), as used herein refers to a touchpoint sequence in connection with particular event, behavior, or action (e.g., a conversion or a non-conversion). In particular, the term "touchpoint path" includes a touchpoint sequence for a user combined with a conversion indication. A conversion indicator indicates whether the corresponding touchpoint sequence resulted in a conversion or a non-conversion (also called a positive conversion or negative conversion).

As used herein, the term "conversion" refers generally to a monitored act, event, or behavior of a user. In particular, the term conversion includes an act, event, or behavior monitored by a publisher (or administrator). For example, the term conversion includes the act of a user committing to a product offered by an entity, selecting (e.g., clicking) a digital link within digital content, or navigating to a particular website. Specifically, the term conversion includes the user converting from a non-paying customer into a paying customer (e.g., by purchasing a product or license). In addition, the term conversions include non-purchases, such as when a user performs a specified action (e.g., signs up for a free-trial or update, downloads an application or software, or performs a membership registration).

As mentioned above, the deep learning attribution system can train a touchpoint attribution attention neural network to generate touchpoint attributions and conversion predictions. The term "machine learning," as used herein, refers to the process of constructing and implementing algorithms that can learn from and make predictions on data. In general, machine learning may operate by building models from example inputs (e.g., training touchpoint paths), such as a training touchpoint sequence and training conversions, to make data-driven predictions or decisions. Machine learning can include neural networks (e.g., the touchpoint attribution attention neural network), data-based models, or a combination of networks and models.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network.

In addition, the term "touchpoint attribution attention neural network" refers to a neural network that includes an attention layer that transform input data (e.g., touchpoint sequences) to generate a prediction with regard to the input data (e.g., a conversion prediction). In particular, as described in greater detail below, a touchpoint attribution attention neural network includes a recurrent neural network (RNN) with a touchpoint attention layer that learns hidden and/or latent features to generate attention weights (or attributions), generate conversion predictions, and/or select potential touchpoints. In one or more embodiments, the touchpoint attribution attention neural network includes an embedding layer, an RNN (LSTM) layer, a touchpoint attention layer, and a classification layer. In one or more embodiments, the touchpoint attribution attention neural network also includes an encoding layer and/or a loss layer. As mentioned, in some embodiments, the RNN layer can employ a long short-term memory (LSTM) network (also called an LSTM layer).

As described in greater detail below, in one or more embodiments the "attention layer" (or touchpoint attention layer) of the touchpoint attribution attention neural network can determine attention weights (e.g., attention coefficients) for touchpoints in a touchpoint sequence. An attention weight of a touchpoint reflects the relative conversion significance of the touchpoint with respect to other touchpoints in the touchpoint sequence. In addition, the attention layer can combine attention weights with corresponding touchpoints (e.g., hidden or latent data corresponding to touchpoints in the touchpoint sequence) to obtain attribution-weighted touchpoints. Further, the attention layer can aggregate each of the attribution-weighted touchpoints to generate a touchpoint sequence representation feature (e.g., vector). The touchpoint sequence representation indicates an attribution-weighted combination of the hidden layers of the touchpoint sequence.

As used herein, the terms "hidden" or "latent" refer to a vector of numeric values representing hidden and/or latent features. In particular, the terms "hidden" or "latent"

includes a set of values corresponding to latent and/or hidden information of touchpoints in a touchpoint sequence. In one or more embodiments, hidden or latent data refers to a low-dimensional latent code vector that is used within one or more layers of the touchpoint attribution attention neural network. For example, the attention layer can receive a first set of latent data corresponding to touchpoints and transform the data into a second set of latent data, as described below.

Further, as described in greater detail below, the classification layer of the touchpoint attribution attention neural network can generate a conversion prediction based on the attention weights. For example, the classification layer can utilize a sigmoid function that determines a probability between zero and one (i.e., 0-1) that a touchpoint sequence produces a conversion based on the touchpoint sequence representation. In some embodiments, the conversion prediction indicates one or more touchpoints that, if added to a target touchpoint sequence, will most likely lead the target user to conversion. In various embodiments, the conversion prediction indicates a media channel (e.g., distribution channel) through which to provide digital content to a target user.

As used herein, the term "digital content" (or simply "content") refers to digital data (e.g., digital data that may be transmitted over a wired or wireless network). In particular, "content" includes images, video, and/or audio data. Moreover, content includes audiovisual content. Examples of digital content include images, text, graphics, animations, advertisements, reviews, summaries, as well as content related to a product or service.

As mentioned above, in various embodiments, the touchpoint attribution attention neural network includes a user bias control machine-learning model. As used herein, the term "user bias control machine-learning model" (or simply "user bias control model") refers to a machine-learning algorithm trained to generate a representation for controlling bias in a neural network. In particular, a user bias control machine-learning model includes a machine learning algorithm trained using time-independent user control variables (e.g., age, gender, and location). For example, in one or more embodiments, a user bias control machine-learning model include a machine-learning algorithm trained using time-independent control variables to determine a user bias control representation (e.g., a representation that, when combined with the touchpoint sequence representation, reduces the media effect biases between user-related attributes and characteristics with respect to conversions). In some embodiments, the user bias control model is a neural network (e.g., a fully connected neural network). As described below, the deep learning attribution system can jointly train the user bias control model with other layers of the touchpoint attribution attention neural network. Further, based on the combined representation of the touchpoint sequence representation and the user bias control representation, the deep learning attribution system can utilize the classification layer of the touchpoint attribution attention neural network to determine a conversion prediction.

As also mentioned above, the deep learning attribution system can employ a loss layer that includes a loss function or loss model to train the touchpoint attribution attention neural network. As used herein, the term "loss function" or "loss model" refers to a function that indicates training loss. In some embodiments, a machine-learning algorithm can repetitively train to minimize total overall loss. For example, the loss function determines an amount of loss with respect to a training touchpoint path by analyzing the conversion prediction and the conversion indication. The loss function then provides feedback, via back propagation, to one or more layers of the touchpoint attribution attention neural network to tune/fine-tune those layers. Examples of loss functions include a softmax classifier function (with or without cross-entropy loss), a hinge loss function, and a least squares loss function.

As used herein, joint training (or joint learning) refers to tuning parameters of multiple learning models are learned together. In particular, joint training (or learning) includes solving a plurality of learning tasks at the same time while utilizing the roles and constraints across the tasks. For example, the deep learning attribution system can employ joint learning to simultaneously train and tune the parameters of the embedding layer, the LSTM layer, the attention layer, and/or the classification layer in connection with the user bias control model.

Referring now to the figures, FIG. 1 illustrates a diagram of an environment 100 in which the deep learning attribution system 104 can operate. As shown in FIG. 1, the environment 100 includes a server device 101 and client devices (i.e., an administrator client device 108 and user client devices 112a-112b). In addition, the environment 100 includes a third-party server device 114 (e.g., one or more webservers). Each of the devices within the environment 100 can communicate with each other via a network 116 (e.g., the Internet).

Although FIG. 1 illustrates a particular arrangement of components, various additional arrangements are possible. For example, the third-party server device 114 communicates directly with the server device 101, or is implemented as part of the server device 101, (shown as a dashed line) rather than via the network 116. In another example, the administrator client device 108 may communicate with the server device 101 through the network 116 rather than via a direct connection.

In one or more embodiments, users associated with the user client devices 112a-b can access digital content provided by the content management system 102 and/or the third-party server device 114 via one or more media channels (e.g., websites, applications, or electronic messages). While FIG. 1 illustrates two user client devices 112a-b, in alternative embodiments, the environment 100 includes any number of user client devices.

As shown, the server device 101 includes a content management system 102, which can manage the storage, selection, distribution, monitoring, and recording of digital content including identifying touchpoints between users and the digital content. The server device 101 can be a single computing device or multiple connected computing devices. In addition, the content management system 102 manages the availability and use of each of the media channels (e.g., media channels) through which digital content can be provided. Further, the content management system 102 facilitates serving digital content to target users (directly or through the third-party server device 114) via one or more media channels to trigger a touchpoint between the user and the digital content.

In some embodiments, the content management system 102 executes various digital content campaigns across multiple digital media channels. Indeed, the content management system 102 can facilitate audiovisual content campaigns, online digital content campaigns, mobile digital content campaigns as well as other campaigns. In various embodiments, the content management system 102 manages bidding auctions to sell impression opportunities available via various digital media channels in real time to large numbers of users (e.g., to thousands of users per second and/or within milliseconds of the users accessing digital assets, such as websites).

In one or more embodiments, the content management system 102 employs the deep learning attribution system 104 to facilitate the various digital content campaigns. In alternative embodiments, the content management system 102 hosts (or communicates with) a separate digital content system that manages and facilitates various digital content campaigns. In these embodiments, the marketing system can communicate with the deep learning attribution system 104.

As shown in FIG. 1, the content management system 102 includes the deep learning attribution system 104. The deep learning attribution system 104 can analyze touchpoints to determine attention weights for touchpoints in touchpoint sequences and/or conversion predictions. In one or more embodiments, the deep learning attribution system 104 trains and utilizes a touchpoint attribution attention neural network to analyze touchpoints, as mentioned above. Additional detail regarding training a touchpoint attribution attention neural network is provided with respect to FIGS. 4A-4C. Similarly, additional detail regarding utilizing a trained touchpoint attribution attention neural network is provided with respect to FIGS. 5A-5B.

FIG. 1 also illustrates the administrator client device 108. An administrator user (e.g., a publisher or administrator) can utilize the administrator client device 108 to manage a digital content campaign. For example, a publisher via the administrator client device 108 can provide digital content and/or campaign parameters (e.g., targeting parameters, target media properties such as websites or other digital assets, budget, campaign duration, or bidding parameters). Moreover, the publisher via the administrator client device 108 can view touchpoint attributions and/or conversion predictions. For example, with respect to a digital content campaign, the administrator employs the administrator client device 108 to access the deep learning attribution system 104 and view graphical user interfaces regarding touchpoint attributions across one or more digital content campaigns. Examples of touchpoint attribution graphical user interfaces are provided in FIGS. 6A-6C below.

As mentioned above, the environment 100 includes the user client devices 112a-b. The content management system 102 can provide digital content to, and receive indications of touchpoints from, the user client devices 112a-b. In various embodiments, the content management system 102 communicates with the third-party server device 114 to provide digital content to the user client devices 112a-b. For instance, the content management system 102 instructs the third-party server device 114 to employ specific media channels when next providing digital content to a target user based on touchpoint attributions or a conversion prediction.

In one or more embodiments, the user client devices 112a-b may include, but are not limited to, mobile devices (e.g., smartphones, tablets), laptops, desktops, or any other type of computing device, such as those described below in relation to FIG. 10. In addition, the third-party server device 114 (and/or the server device 101) can include or support a web server, a file server, a social networking system, a program server, an application store, or a content provider. Similarly, the network 116 may include any of the networks described below in relation to FIG. 10.

With respect to obtaining touchpoint information, in one or more embodiments the content management system 102 and/or the deep learning attribution system 104 monitors various interactions, including data related to the communications between the user client devices 112a-b and the third-party network server device 114. For example, the content management system 102 and/or the deep learning attribution system 104 monitors interaction data that includes, but is not limited to, data requests (e.g., URL requests, link clicks), time data (e.g., a time stamp for clicking a link, a time duration for a web browser accessing a webpage, a time stamp for closing an application), path tracking data (e.g., data representing webpages a user visits during a given session), demographic data (e.g., an indicated age, sex, or socioeconomic status of a user), geographic data (e.g., a physical address, IP address, GPS data), and transaction data (e.g., order history, email receipts).

For instance, the first client device 112a communicates with the third-party network server device 114 to request for information or content (such as a webpage). The content management system 102 and/or the deep learning attribution system 104 monitors the information request, the time the request was made, the geographic information associated with the first client device 112a (e.g., a geographic area associated with an IP address assigned to the first client device 112a or GPS information identifying a location of the first client device 112a), and any demographic/user profile data associated with a corresponding user.

The content management system 102 and/or the deep learning attribution system 104 can monitor user data in various ways. In one or more embodiments, the third-party network server device 114 tracks the user data and then reports the tracked user data to the content management system 102 and/or the deep learning attribution system 104. Alternatively, the content management system 102 and/or the deep learning attribution system 104 receives tracked user data directly from the client devices 112a-b. In particular, the content management system 102 and/or the deep learning attribution system 104 may receive information via data stored on the client device (e.g., a browser cookie, cached memory), embedded computer code (e.g., tracking pixels), a user profile, or engage in any other type of tracking technique. Accordingly, the content management system 102 and/or the deep learning attribution system 104 can receive tracked user data from the third-party network server device 114, the network 116, and/or the client devices 112a-b.

To illustrate, in one or more embodiments, the content management system 102, via the server device 101 and the third-part server device 114, execute a digital content campaign and provide digital content through multiple media channels to the client devices 112a-b. During the digital content campaign, the content management system 102 monitors user interactions at the user client devices 112a-b to determine touchpoints and corresponding conversions. The deep learning attribution system 104, via the server device 101, can generate training touchpoint paths for users of the user client devices 112a-112b and utilize the training touchpoint paths to train a touchpoint attribution attention neural network. In particular, the deep learning attribution system 104 can then utilize the trained touchpoint attribution attention neural network to determine attributions based on attention weights for the previous touchpoints for the user client devices 112a-b (e.g., provide a graphical user interface to the administrator client device 108 illustrating prior touchpoints and corresponding attribution data).

Moreover, the deep learning attribution system 104 can utilize the server device 101 to generate conversion predictions for potential touchpoints for individual users (e.g., additional digital content to be sent through one or more media channels) using the trained touchpoint attribution attention neural network and select a media channel for a particular user based on the conversion predictions. Further, in some embodiments, the deep learning attribution system 104, via the server device 101, can provide digital content to a client device (e.g., the client devices 112*a*) through the selected media channel.

Figure 2A:
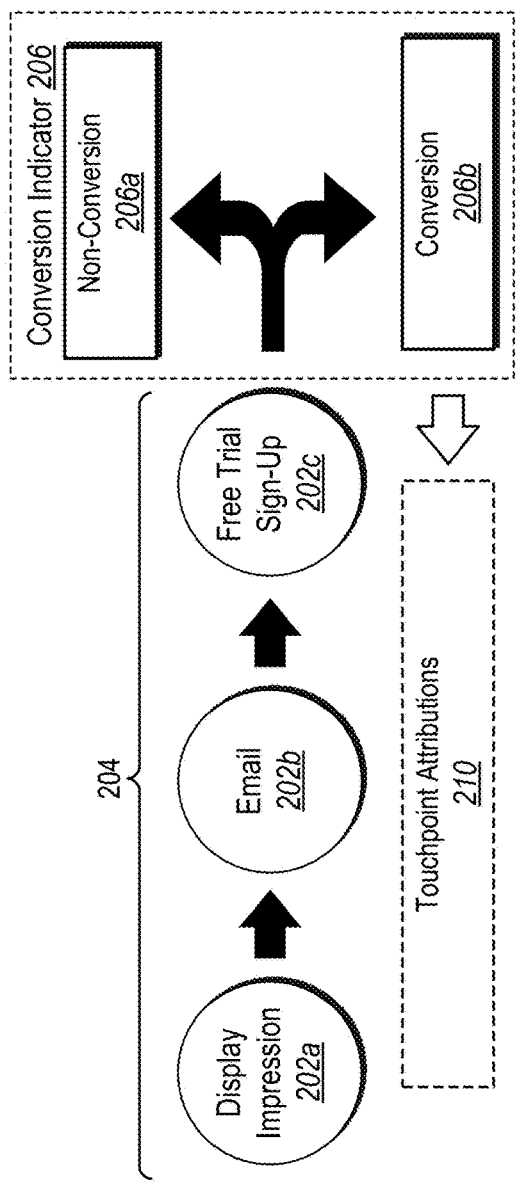
FIGS. 2A-2B illustrate diagrams of touchpoint sequences for a user via a plurality of digital media channels in accordance with one or more embodiments.
Figure 2B:
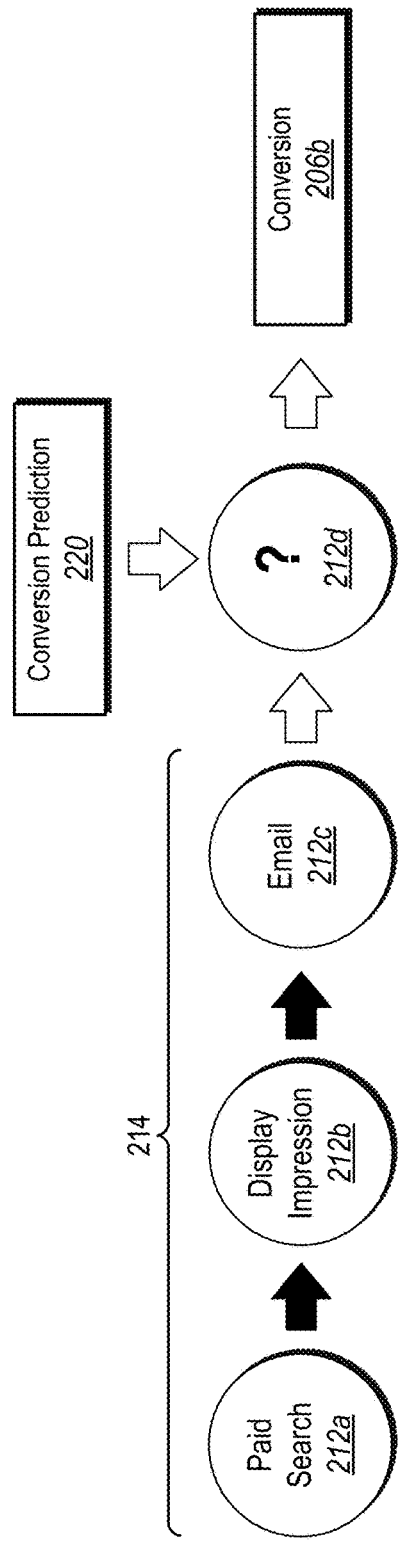

Turning now to FIGS. 2A and 2B, additional detail is now provided regarding touchpoints, including touchpoint paths, touchpoint sequences, touchpoint attributions, conversions, and conversion predictions. For example, FIG. 2A illustrates various touchpoints 202*a-c* with a user client device in relation to multiple digital media channels. As mentioned above, touchpoints include points of contact between a user an entity (e.g., a product provider) such that the user interacts with the entity is some way. Accordingly, each of the touchpoints in FIG. 2A corresponds to a single user interacting with the same entity.

As shown, the first touchpoint 202*a* is a display impression of digital content. In one or more embodiments, a content provider or advertisement service within the content management system 102 or the third-party server 114 described above delivers digital content associated with the first touchpoint to the user via the user's client device. The content provider or advertisement service can display the digital content to the user via one or more digital media channels, such as serving or downloading the digital content to the user via web page, mobile application, a streaming service, and/or other digital media channels.

In addition, the second touchpoint 202*b* is shown as an email (i.e., email content) sent to the user. As with other touchpoints, an email touchpoint can be associated with additional touchpoint granularity based on different levels of user interaction. Examples of further email touchpoints include email sent, email opened/read, email replied, and email clicked. The third touchpoint 202*c* is shown as a free trial sign-up. While the free trial sign-up is shown as a touchpoint, in some embodiments, the free trial sign-up is an indication of a conversion.

As also shown, the touchpoints 202*a-c* form a touchpoint sequence 204. A touchpoint sequence includes one or more touchpoints arranged in order of occurrence (e.g., based on when the user interacted with each touchpoint). For instance, in one or more embodiments, each touchpoint includes a time (e.g., a timestamp) of when the touchpoint occurred, and the deep learning attribution system 104 identifies the touchpoint sequence based on the touchpoint times.

FIG. 2 also shows a conversion indicator 206. The conversion indicator 206 indicates whether the touchpoint sequence 204 resulted in a non-conversion 206*a* or a conversion 206*b*. As a default, the conversion indicator 206 for each touchpoint sequence can be labeled as a non-conversion 206*a* (or a negative conversion). In one or more embodiments, at the time of conversion, the label of the conversion indicator 206 for the touchpoint sequence changes to a conversion 206*b* (or a positive conversion).

As mentioned above, a touchpoint sequence 204 can be a training touchpoint sequence or a target touchpoint sequence. For instance, the deep learning attribution system 104 employs training touchpoint sequences to train the touchpoint attribution attention neural network. Once trained, the deep learning attribution system 104 utilizes the trained touchpoint attribution attention neural network to analyze target touchpoint sequences to determine either touchpoint attributions (e.g., FIG. 2A) or a conversion prediction (e.g., FIG. 2B).

To illustrate, using FIG. 2A as a representative target touchpoint sequence, the deep learning attribution system 104 determines touchpoint attributions 210 for the touchpoint sequence 204. More particularly, the deep learning attribution system 104 receives the touchpoint sequence 204 along with the conversion indicator 206 indicating that the touchpoint sequence 204 resulted in a conversion 206*b*. Based on the conversion indicator 206 of the conversion 206*b*, the deep learning attribution system 104 feeds the touchpoint sequence 204 into the trained touchpoint attribution attention neural network to determine the touchpoint attributions 210 for the touchpoint sequence 204. The deep learning attribution system 104 can train the touchpoint attribution attention neural network based on a plurality (e.g., thousands or millions) of training touchpoint sequences.

The touchpoint attributions 210 include a weight, coefficient, number, or other values indicating how influential each touchpoint in the touchpoint sequence 204 was in leading to the reported conversion. In many embodiments, the sum of touchpoint attributions 210 adds to one. For example, the deep learning attribution system 104 determines that the first touchpoint 202*a* (i.e., display impression) has an attribution value of 15%, the second touchpoint 202*b* (i.e., email) has an attribution value of 35%, and the free trial sign-up has an attribution scale of 50%. In alternative embodiments, the sum of touchpoint attributions 210 does not add to one or is above one.

Even in embodiments where a target touchpoint sequence does not result in a conversion 206*b*, the deep learning attribution system 104 can utilize the trained touchpoint attribution attention neural network to determine and provide a conversion prediction for the touchpoint sequence. For example, as shown in FIG. 2B, a second target touchpoint sequence 214 includes touchpoints 212*a-c* that have not yet resulted in a conversion. Therefore, the deep learning attribution system 104 utilizes a trained touchpoint attribution attention neural network to determine a conversion prediction 220.

The conversion prediction 220 can identify a touchpoint that, if added to the second target touchpoint sequence 214 (e.g., the fourth touchpoint 212*d*) would have the highest probability of resulting in a conversion 206*b*. For example, in one or more embodiments, the deep learning attribution system 104 determines the conversion probability for each potential touchpoint that can be added to the second target touchpoint sequence 214. The deep learning attribution system 104 then utilizes the touchpoint with the highest conversion probability as the conversion prediction 220.

In some embodiments, if the highest conversion likelihood is below a predetermined conversion probability threshold (e.g., <50%), the deep learning attribution system 104 can repeat the process to identify additional touchpoints to add to the second target touchpoint sequence 214 to improve the likelihood of conversion. For example, upon adding a second email touchpoint, the second target touchpoint sequence 214 has a conversion probability of 40%. Further adding an in-app notification touchpoint further increases the conversion probability to 60%.

In identifying a potential touchpoint for the target user, the deep learning attribution system 104 can indicate one or more media channels. Indeed, the deep learning attribution system 104 can select a media channel that is most likely to result in a conversion. Thus, in some embodiments, the conversion prediction 220 includes which digital media channels to employ when serving digital content (either directly or indirectly) to a target user.

Figure 3:
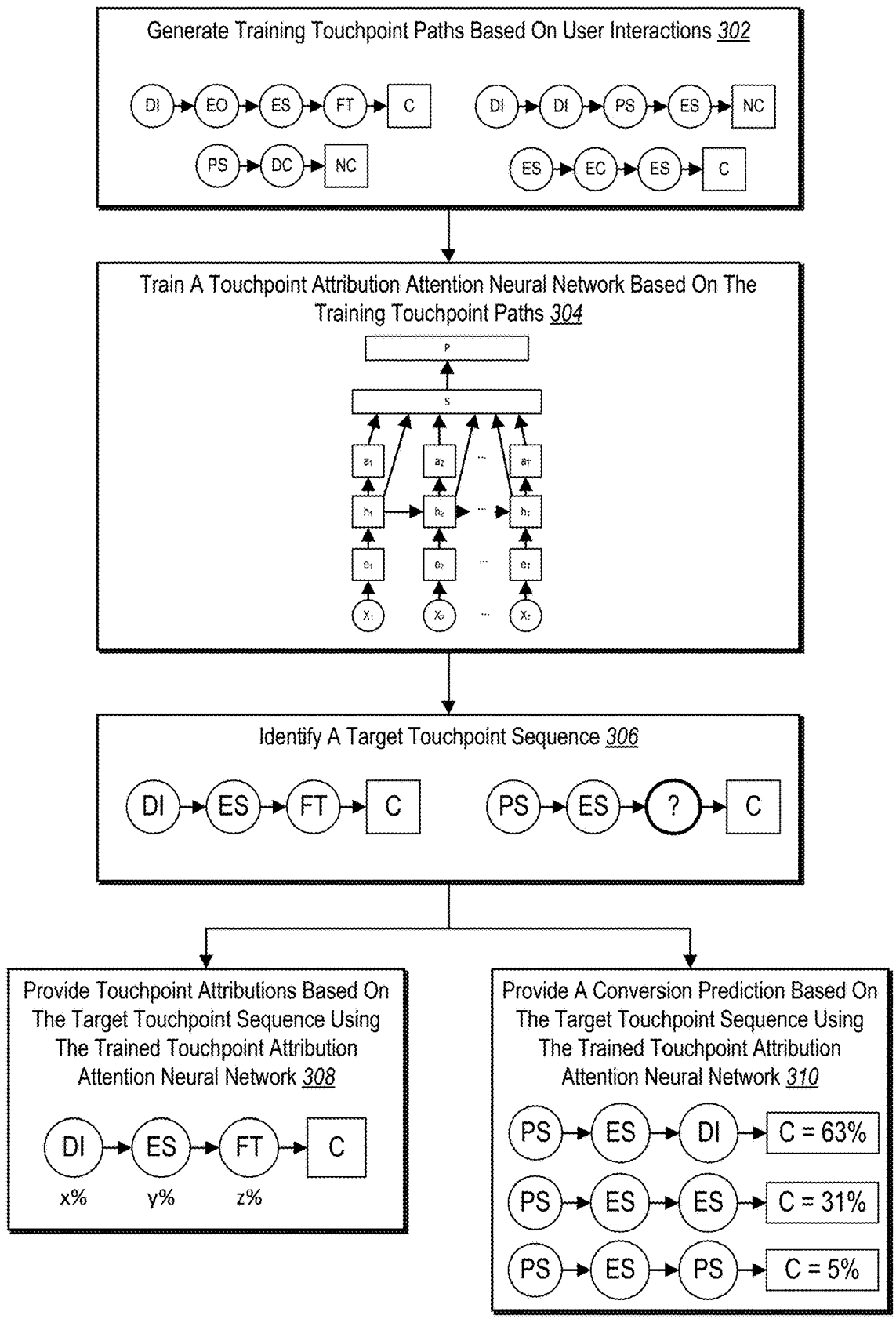
FIG. 3 illustrates training and utilizing a touchpoint attribution attention neural network to generate touchpoint attributions and conversion predictions in accordance with one or more embodiments.

As mentioned above, the deep learning attribution system 104 can train and utilize a touchpoint attribution attention neural network. FIG. 3 illustrates training and utilizing a touchpoint attribution attention neural network in accordance with one or more embodiments. As shown in relation to the embodiment of FIG. 3, the deep learning attribution system 104 performs an act 302 of generating training touchpoint paths based on user interactions. For instance, the deep learning attribution system 104 obtains touchpoint data from a database that maintains touchpoint information related to an entity and/or product, where each touchpoint includes a touchpoint identifier, a user identifier, and an interaction time (e.g., timestamp). In one or more embodiments, the deep learning attribution system 104 filters each of the touchpoints by user (e.g., user identifier) to identify touchpoints between an individual user and the entity/product. If the touchpoints are associated with an entity, in additional embodiments, the deep learning attribution system 104 can further filter the touchpoints based on a specific product. Similarly, the deep learning attribution system 104 can filter touchpoints to a given time window (e.g., touchpoints within the past week, month, or year).

Using the identified touchpoints between an individual user and the product (or the entity), the deep learning attribution system 104 can arrange the identified touchpoints into a touchpoint sequence based on time. For example, the deep learning attribution system 104 arranges the identified touchpoints into a touchpoint sequence based on the timestamps of each touchpoint.

Further, in some embodiments, the deep learning attribution system 104 can tokenize touchpoints in a touchpoint sequence. For example, the deep learning attribution system 104 can group two similar touchpoints as one if the two touchpoints occur within a predetermined time (e.g., within one or more hours or the same day). For instance, if a user views multiple display impressions within the same day, the deep learning attribution system 104 groups the touchpoints together as a single display impression touchpoint for the day within a touchpoint sequence. Alternatively, the deep learning attribution system 104 includes every touchpoint in a touchpoint sequence regardless of how soon it occurs after a previous touchpoint or if it is a duplicative touchpoint.

In addition, the deep learning attribution system 104 obtains conversion information with respect to the user. For example, the deep learning attribution system 104 determines engaged in a particular act corresponding to a conversion (e.g., whether the user purchased, subscribed, committed, or otherwise committed to the product offered by the entity). If a conversion occurs, the deep learning attribution system 104 can also identify the time of conversions (e.g., a conversion time, such as a timestamp). In some embodiments, the deep learning attribution system 104 identifies multiple conversion occurrences between a user and an entity/product (e.g., the user purchased two related products from the entity and/or first purchased a product and then subsequently purchased add-ons to the product).

Using the touchpoint sequence and the conversion information, the deep learning attribution system 104 can generate one or more touchpoint paths. As described above, a touchpoint path includes touchpoint sequence for a user combined with a conversion indication (e.g., a conversion or non-conversion). To illustrate, FIG. 3 shows various touchpoint paths that include touchpoints (e.g., "DI" or display impression, "DC" or display click, "ES" or email sent, "EO" or email opened, "EC" or email clicked, "FT" or free trial sign-up, and "PS" or paid search) as well as conversion indicators (e.g., "C" or conversion and "NC" or non-conversion).

In one or more embodiments, the deep learning attribution system 104 employs the conversion time to determine the last touchpoint in the touchpoint sequence that leads to the conversion (e.g., the conversion indicates the end time of the touchpoint path). In one or more embodiments, the deep learning attribution system 104 removes touchpoints from the touchpoint sequence that occurred after the time of conversion.

In various embodiments, the deep learning attribution system 104 generates multiple touchpoint paths using a touchpoint sequence and conversion information. For example, if a touchpoint sequence includes three touchpoints before a conversion, the deep learning attribution system 104 generates a first touchpoint path that includes the first two touchpoints in the touchpoint sequence and a non-conversion indicator (e.g., a negative touchpoint path). In addition, the deep learning attribution system 104 generates a second touchpoint path that includes the three touchpoints and a conversion indicator (e.g., a positive touchpoint path). In some embodiments, the deep learning attribution system 104 generates a separate touchpoint path for each time period (e.g., hour, hours, or day) for which at least one touchpoint occurs (and whether a conversion consequently resulted).

Similarly, when multiple conversions are detected for a user, the deep learning attribution system 104 can reuse touchpoints in a touchpoint sequence in different touchpoint paths. For instance, continuing the above example, the deep learning attribution system 104 generates a first touchpoint path that includes the three touchpoints and a first conversion indicator. Additionally, the deep learning attribution system 104 generates a second touchpoint path that includes the three touchpoints as well as a fourth touchpoint (occurring after the first conversion) along with a second conversion indicator associated with a second conversion. In one or more embodiments, the number of touchpoint sequence paths generated per touchpoint sequence/conversion may depend on the amount of available data, and the amount of data needed to sufficiently train the touchpoint attribution attention neural network.

As shown in FIG. 3, the deep learning attribution system 104 performs the act 304 of training a touchpoint attribution attention neural network based on the training touchpoint paths. For example, the deep learning attribution system 104 feeds the training touchpoint paths into the touchpoint attribution attention neural network. As further described below in connection with FIG. 4A, the touchpoint attribution attention neural network determines touchpoint attributions for each touchpoint in a touchpoint sequence as well as determines whether the touchpoint sequence leads to conversion. In particular, the touchpoint attribution attention neural network uses the conversion indicator in a touchpoint path and supervised learning to accurately classify whether a touchpoint sequence will lead to conversion given the touchpoint attention weights generated for touchpoints in the touchpoint sequence.

In various embodiments, training the touchpoint attribution attention neural network includes training a time-decay parameter within the touchpoint attribution attention neural network that further accounts for lag between touchpoints as well as between touchpoints and conversion time. Additional detail regarding incorporating a time-decay parameter for touchpoints is described below with respect to FIG. 4B.

In one or more embodiments, training the touchpoint attribution attention neural network includes jointly training a user bias control model (e.g., a user bias control machine-learning model) along with various layers of the touchpoint attribution attention neural network. In these embodiments, the deep learning attribution system 104 feeds time-independent control variables to the user bias control model, which enables the trained touchpoint attribution attention neural network to reduce media effect biases between user-related attributes and characteristics. Additional detail regarding incorporating a user bias control model within the touchpoint attribution attention neural network is described below with respect to FIG. 4C.

Once trained, the deep learning attribution system 104 can employ the touchpoint attribution attention neural network to provide touchpoint attributions (e.g., touchpoint attention weights) and/or conversion predictions for target input touchpoint sequences. To illustrate, FIG. 3 shows the deep learning attribution system 104 performing an act 306 of identifying a target touchpoint sequence. The target touchpoint sequence can be associated with a conversion or a non-conversion.

If the target touchpoint sequence includes a conversion (e.g., a positive touchpoint path), the deep learning attribution system 104 can feed the target touchpoint sequence through the trained touchpoint attribution attention neural network and determine the touchpoint attribution for each touchpoint in the target touchpoint sequence that leads to the conversion. As shown, the deep learning attribution system 104 performs the act 308 of providing touchpoint attributions based on the target touchpoint sequence using the trained touchpoint attribution attention neural network. Additional detail regarding providing touchpoint attributions is described with respect to FIG. 5A below.

In various embodiments, the deep learning attribution system 104 determines the touchpoint attributions for a number of target touchpoint sequences. For example, during or after one or more digital content campaigns, the deep learning attribution system 104 determines the touchpoint attributions for each target touchpoint sequence that is associated with a conversion. The deep learning attribution system 104 can then present graphical results to an administrator of the campaigns that aggregates (and, in some cases, normalizes) the touchpoint attributions across the campaigns. In this manner, the deep learning attribution system 104 provides an accurate measure of influence for each touchpoint employed in the digital content campaigns.

If the target touchpoint sequence does not include a conversion (e.g., a negative touchpoint path), the deep learning attribution system 104 can feed the target touchpoint sequence through the trained touchpoint attribution attention neural network and determine a conversion prediction for the target touchpoint sequence. As shown, the deep learning attribution system 104 provides 310 a conversion prediction based on the target touchpoint sequence using the trained touchpoint attribution attention neural network.

As mentioned above, in one or more embodiments, a conversion prediction can include which touchpoint or touchpoints to next serve to the target user to trigger a conversion. In various embodiments, the conversion prediction includes the likelihood or probability that providing a given touchpoint (e.g., providing digital content to a client device through a particular digital media channel) will trigger the conversion. To illustrate, FIG. 3 shows how adding different touchpoints to the identified target touchpoint sequence results in different conversion likelihoods. Additionally, or alternatively, the conversion prediction can include which media channel to employ to achieve to identified touchpoint. Additional detail regarding providing conversion predictions is described with respect to FIG. 5B below.

Figure 4A:
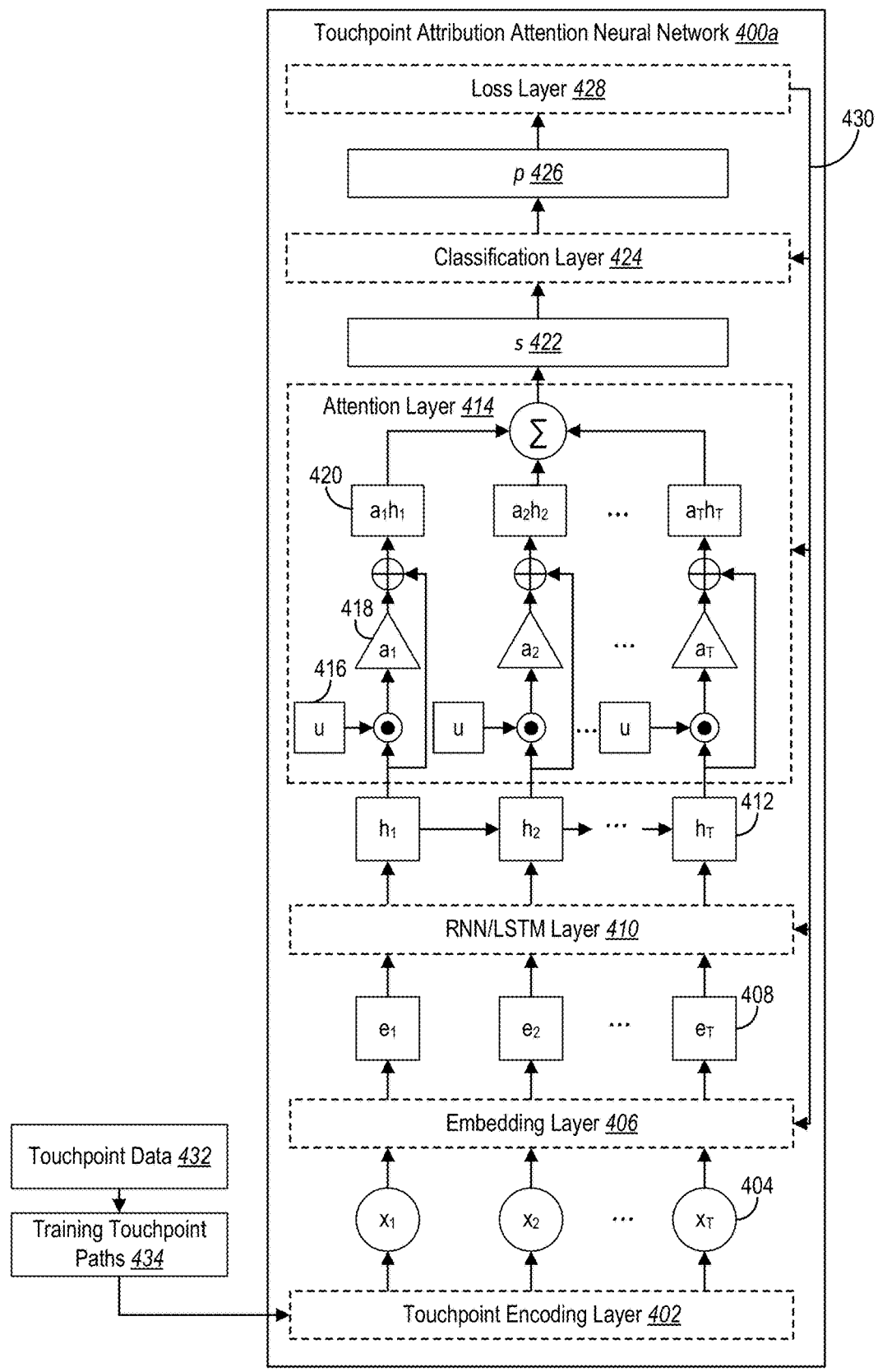
FIGS. 4A-4C illustrate training a touchpoint attribution attention neural network in accordance with one or more embodiments.
Figure 4B:
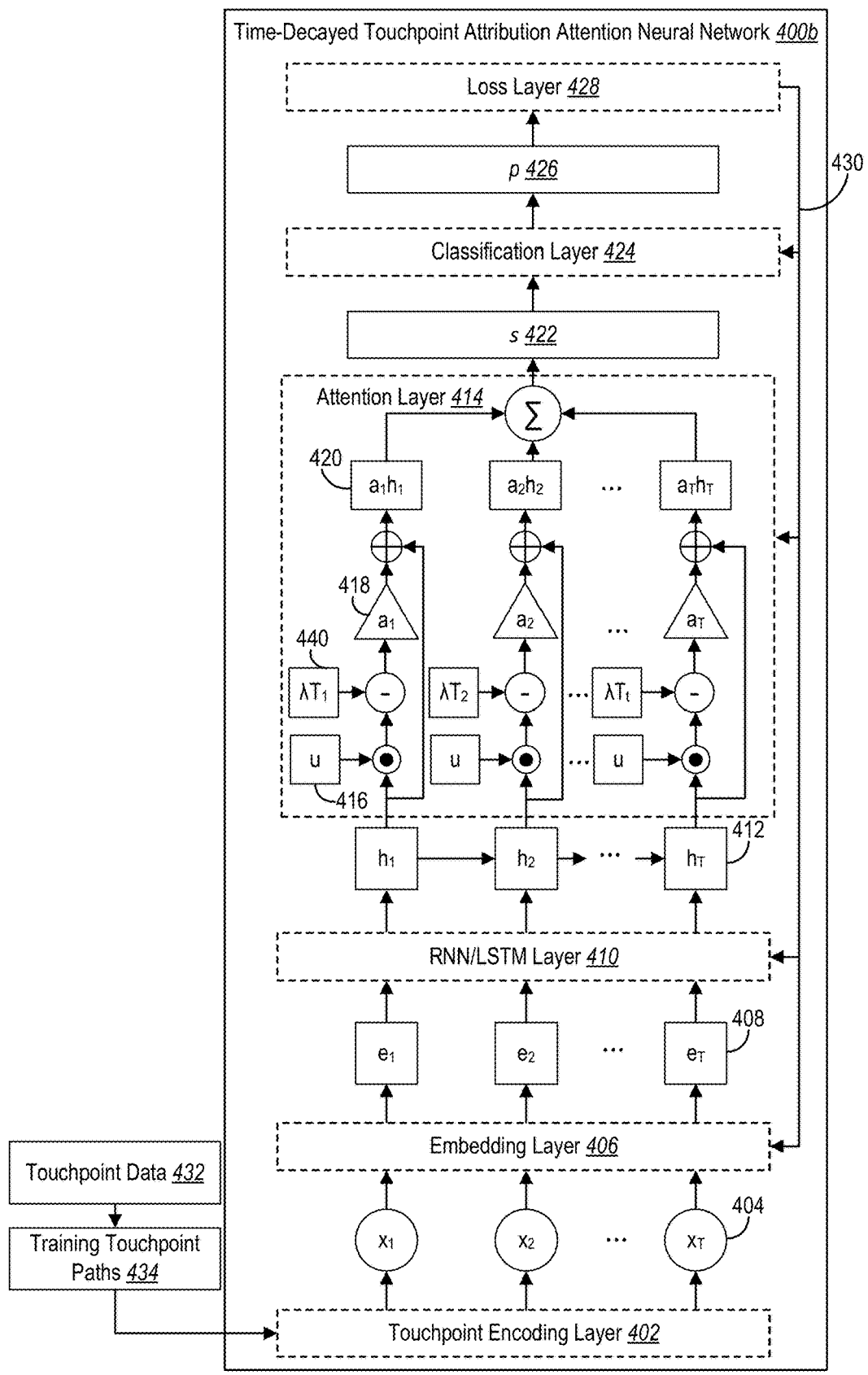
Figure 4C:
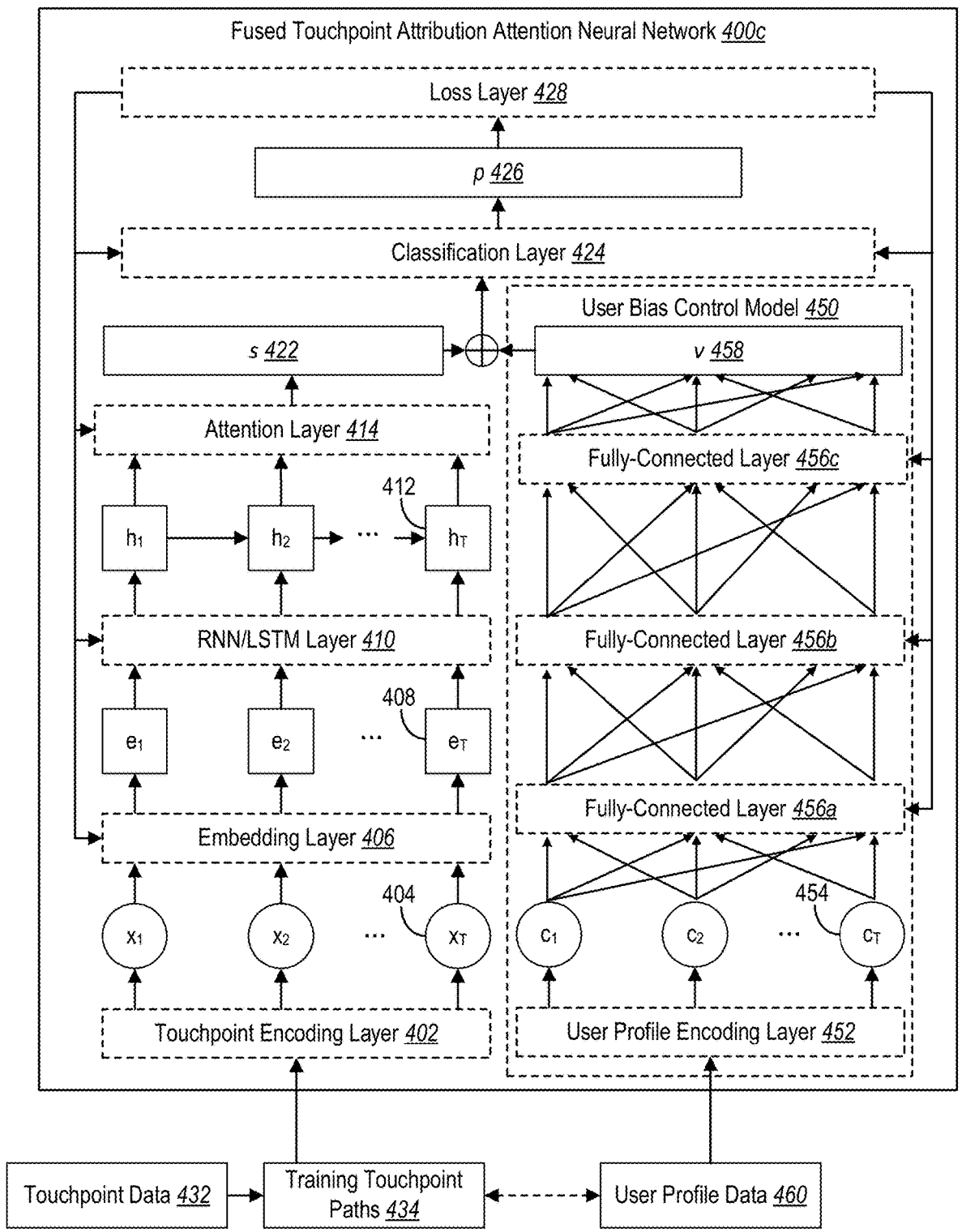

Turning now to FIGS. 4A-4C, additional detail is provided with respect to training the touchpoint attribution attention neural network. As mentioned above, FIG. 4A describes training a touchpoint attribution attention neural network to determine accurate attention weights and conversion predictions for touchpoint sequences. FIG. 4B describes training a touchpoint attribution attention neural network that includes a time-decay parameter within the attention layer. FIG. 4C describes jointly training a user bias control model with other layers of the touchpoint attribution attention neural network.

As illustrated, FIG. 4A includes a touchpoint attribution attention neural network 400a having multiple neural network layers (or simply "layers"). Each illustrated layer can represent one or more types of neural network layers and/or include an embedded neural network. For example, the touchpoint attribution attention neural network 400a includes a touchpoint encoding layer 402, an embedding layer 406, a RNN/LSTM layer 410, an attention layer 414, and a classification layer 424. In addition, during training, the touchpoint attribution attention neural network 400a includes a loss layer 428. As described below, each layer transforms input data into a more useable form for the next layer (e.g., by changing the dimensionality of the input), which enables the touchpoint attribution attention neural network 400a to analyze features at different levels of abstraction and learn to determine touchpoint attention weights for training touchpoint sequences.

As described above (e.g., in relation to FIG. 3), the deep learning attribution system 104 identifies touchpoint data 432 and generates training touchpoint paths 434 from the touchpoint data 432. For example, the deep learning attribution system 104 generates a touchpoint path that includes a training touchpoint sequence of touchpoint interactions between a given user and an entity. In addition, the touchpoint path includes a conversion indicator of whether (and when) the training touchpoint sequence resulted in a conversion.

As shown, the deep learning attribution system 104 feeds the training touchpoint paths 434 into the touchpoint attribution attention neural network 400a as part of training. In particular, the deep learning attribution system 104 provides the training touchpoint paths 434 to the touchpoint encoding layer 402 of the touchpoint attribution attention neural network 400a to encode the training touchpoint sequence within the training touchpoint paths 434. In some embodiments, the deep learning attribution system 104 encodes the training touchpoint paths 434 outside of the touchpoint attribution attention neural network 400a and provides the encoded touchpoints to the touchpoint attribution attention neural network 400a.

In one or more embodiments, the touchpoint encoding layer 402 encodes the touchpoints using one-hot encoding representation. For example, the touchpoint encoding layer 402 creates a vector that includes entries for each touchpoint type. Each entry is initialized to zero (i.e., 0). To encode a touchpoint in a training touchpoint sequence, the touchpoint encoding layer 402 changes the entry corresponding to the touchpoint to one (i.e., 1) while leaving the other entries at zero. In this manner, the touchpoint encoding layer 402 converts each touchpoint in a training touchpoint sequence into a separately encoded vector. In alternative embodiments, the touchpoint encoding layer 402 employs other or additional encoding methods to encode touchpoints in a training touchpoint sequence.

More particularly, in one or more embodiments, the deep learning attribution system 104 provides a touchpoint path P that includes multiple touchpoints $tp_1, tp_2, \ldots tp_T$ to the touchpoint encoding layer 402. Upon being encoded (e.g., using one-hot encoding), the touchpoint encoding layer 402 outputs encoded touchpoint vectors 404, shown as $x_1, x_2, \ldots x_T$ in FIG. 4A, which is a sequential time series of the training touchpoint sequence. In one or more embodiments, the encoded touchpoint vectors 404 for a training touchpoint sequence is represented as $x_t, t \in [0, T]; x_t \in \mathbb{R}^{v_{tp}}$, where $v_{tp}$ is the total number of all possible touchpoints types and T is the length of the training touchpoint sequence in the touchpoint path P, which varies for each training touchpoint sequence.

Using the encoded touchpoint vectors 404, the deep learning attribution system 104 can continue to train the touchpoint attribution attention neural network 400a. In particular, in various embodiments, the deep learning attribution system 104 performs the act 404 of providing the encoded touchpoint vectors as input to the embedding layer 406. In general, the embedding layer 406 quantifies and categorizes hidden contextual similarities between touchpoint types based on the touchpoint's distribution given a large sample of training touchpoint paths 434, which overcomes the issue of touchpoint representation sparsity.

To illustrate, the embedding layer 406 transforms the encoded touchpoint vectors 404 (e.g., changes the dimensionality of the input) to dense vectors 408, shown as $e_1, e_2, \ldots e_T$, using an embedding matrix $W_e$ (e.g., a weighted matrix), where $W_e \in \mathbb{R}^{v_e \times v_{tp}}$. Indeed, the deep learning attribution system 104 applies the embedding matrix $W_e$ to the encoded touchpoint vectors 404 (i.e., $W_e x_t = e_T$) to obtain dense vector latent representations of each touchpoint in a training touchpoint sequence. Notably, the $t^{th}$ column of the embedding matrix $W_e$ is a vector having the dimension $v_e$ and is a continuous representation of the $t^{th}$ touchpoint in the training touchpoint sequence.

As described further below, in various embodiments, the deep learning attribution system 104 trains the neural network to learn the embedding matrix (i.e., $W_e$). For example, the deep learning attribution system 104 randomly initializes the embedding matrix and tunes its parameters through supervised training. In this manner, the embedding matrix learns how to embed the encoded touchpoint vectors 404 to surface important touchpoint features when creating the dense vectors 408.

The deep learning attribution system 104 can use the dense vectors 408 output from the embedding layer 406 as input to the RNN/LSTM layer 410. As shown, the RNN/LSTM layer 410 includes a LSTM neural network, which is a type of RNN network. In alternative embodiments, the deep learning attribution system 104 employs another type of RNN neural network, such as another type of memory-based neural network, as the RNN/LSTM layer 410 of the touchpoint attribution attention neural network 400a.

By employing an LSTM neural network as the RNN/LSTM layer 410, the deep learning attribution system 104 can obtain another layer of touchpoint representation using the dense vectors 408 as input. For instance, for each touchpoint in a training touchpoint sequence, the RNN/LSTM layer 410 incorporates the specific sequence of preceding touchpoints in the training touchpoint sequence. Additionally, the RNN/LSTM layer 410 enables the deep learning attribution system 104 to encode contextual information from the previous touchpoints (e.g., historical touchpoint data) into each touchpoint in the training touchpoint sequence. Indeed, the RNN/LSTM layer 410 models sequential inputs by integrating the time series sequence of previous touchpoints into each touchpoint.

More particularly, in various embodiments, the RNN/LSTM layer 410 transforms the dense vectors 408 to create hidden state vectors 412, shown as $h_1, h_2, \ldots h_T$ in FIG. 4A, based on the dense vectors 408 (e.g., $e_t$) and the hidden state vectors from previous touchpoints in a training touchpoint sequence (e.g., $h_{t-1}$). For example, Equation 1 below provides a formula for calculating $h_t$. In Equation 1, $\mathcal{H}$ represents a nonlinear transformation function and $h_t \in \mathbb{R}^{v_h}$.

$$h_t = \mathcal{H}(e_t, h_{t-1}), t \in [0, T] \quad (1)$$

As mentioned above, an LSTM neural network is a type of RNN. In particular, LSTM is a sophisticated version of RNN that can handle long-term dependencies in sequences by maintaining cell state vectors using an input gate, a forget gate, a memory gate, and/or an output gate. By employing one or more of these gates, the LSTM can control the amount of information allowed to be present in a neural network, to pass through (and not pass through) the network, to be retained by the network, and to be output by the network. For instance, in some instances, the LSTM forgets touchpoint information that it learns to be of little importance for determining touchpoint attention weights.

A detailed formula for creating the hidden state output $h_t$ using a LSTM is shown below in Equations 2-6. Equations 2-6 include the cell state vector $c_t$, input gate $i_t$, forget gate $f_t$ and output gate $o_t$ mentioned previously. In addition, in Equations 2-6, the operator • represents an entry-wise product (e.g., the Hadamard product), tanh(•) represents a hyperbolic tangent function of tanh(x), and σ(x) represents a usually nonlinear activation function (e.g., a sigmoid function or ReLU).

$$i_t = \sigma(W_e^i e_t + W_h^i h_{t-1} + b_i) \quad (2)$$

$$f_t = \sigma(W_e^f e_t + W_h^f h_{t-1} + b_f) \quad (3)$$

$$c_t = f_t \cdot c_{t-1} + i_t \cdot \tanh(W_e^c e_t + W_h^c h_{t-1} + b_c) \quad (4)$$

$$o_t = \sigma(W_e^o e_t + W_h^o h_{t-1} + b_o) \quad (5)$$

$$h_t = o_t \cdot \tanh(c_t) \quad (6)$$

In one or more embodiments, each block in the RNN/LSTM layer 410 operates in only the forward direction, which diverges from bidirectional LSTM neural networks. In this manner, the RNN/LSTM layer 410 creates hidden state vectors 412 that include future looking information for the attention layer 414 to process. Indeed, in the touchpoint attribution conversion setting, future touchpoints in a training touchpoint sequence can be triggered based on historical observations, but past touchpoints in a training touchpoint sequence cannot be altered by future touchpoints.

As mentioned above, the RNN/LSTM layer 410 transforms the dense vectors 408 to include another level of touchpoint representation that includes contextual and sequence information of previous touchpoints in a training touchpoint sequence. Indeed, each of the hidden state vectors 412 (i.e., $h_t$) created by the RNN/LSTM layer 410 can be considered a new representation of the $t^{th}$ touchpoint that includes all historical contextual information of touchpoints in the training touchpoint sequence. For instance, each of the hidden state vectors 412 is able to better describe the contextual meaning of a touchpoint in the specific touchpoint path compared with the raw dense vectors 408 (i.e., $e_t$), which are unaware of past contextual and hidden information. Further, in many embodiments, this added layer of touchpoint representation improves a user's conversion journey, since the order, frequency, and long-term dependency of touchpoint exposure often has a high impact on the user's final conversion decision.

As shown in FIG. 4A, the touchpoint attribution attention neural network 400a includes the attention layer 414 (also referred to as the attention mechanism). In various embodiments, the attention layer 414 determines attention weights 418 for each touchpoint in a training touchpoint sequence. As mentioned above, the attention weight reflects the relative conversion importance or significance of each digital target touchpoint in a training touchpoint sequence given the previous touchpoints in the training touchpoint sequence. Indeed, not all touchpoints contribute equally to the representation of a user's conversion journey. Hence, the deep learning attribution system 104 trains the attention layer 414 to extract touchpoints that are more significant to a conversion such that the attention weights 418 capture the incremental importance of each touchpoint.

As shown in FIG. 4A, the deep learning attribution system 104 trains the attention layer 414 by providing the hidden state vectors 412 (i.e., $h_1, h_2, \ldots, h_T$) to the attention layer 414. Using each of the hidden state vectors 412 in combination with a touchpoint context vector 416 (i.e., u), the deep learning attribution system 104 determines attention weights 418 (i.e., $a_1, a_2, \ldots, a_T$) for each touchpoint in the training touchpoint sequence. In general, the attention weights 418 are fractional values ranging between zero and one (i.e., 0-1). In some embodiments, the attention weights 418 together sum to one or near one. In alternative embodiments, the attention weights 418 do not add to one.

As mentioned above, the attention layer 414 employs a touchpoint context vector 416 to determine the attention weights 418. For simplicity in illustration, each occurrence of the touchpoint context vector 416 represents the same touchpoint context vector 416. In one or more embodiments, the touchpoint context vector 416 is set up as a uniform vector that initially gives each touchpoint type equal importance. In some embodiments, the touchpoint context vector 416 is set up with select prioritized touchpoints. In alternative embodiments, the touchpoint context vector 416 is randomly initialized. Regardless of initialization, the attention layer 414 can train the weights and parameters of the touchpoint context vector 416 to learn to best distinguish important touchpoint features from less important touchpoint features.

In general, the touchpoint context vector 416 is a high-level representation of a fixed sequence based on domain knowledge about touchpoint importance. Accordingly, the deep learning attribution system 104 and/or a campaign administrator can customize the attribution model by constraining the touchpoint context vector 416. For example, the campaign administrator can flag particular touchpoints as being more significant than others to have the deep learning attribution system 104 conform to a prescribed touchpoint bias, which influences training of the touchpoint context vector 416.

In addition, the deep learning attribution system 104 trains the attention layer 414 by combining the attention weights 418 for each touchpoint with the corresponding hidden state vectors 412 to obtain weighted hidden state vectors 420 (i.e., $a_1h_1, a_2h_2, \ldots, a_Th_T$). Each of the weighted hidden state vectors 420 reflects a more accurate representation of a touchpoint's conversion significance with respect to a user's conversion given the specific sequence of touchpoints.

Further, as shown, the deep learning attribution system 104 can aggregate the representation of the weighted hidden state vectors 420 to form a touchpoint sequence representation 422 (i.e., s). In general, the touchpoint sequence representation 422 is a convex combination vector of all the hidden information of the training touchpoint sequences, where each touchpoint is appropriately weighted based on its relative conversion significance. Additionally, the touchpoint sequence representation 422 represents a final prediction of whether the training touchpoint sequence results in a conversion.

More particularly, Equations 7-9, shown below, provide an example formula for determining the attention weights 418, the weighted hidden state vectors 420, and the touchpoint sequence representation 422.

$$v_t = \tanh(W_v h_t + b_v) \tag{7}$$

$$a_t = \frac{\exp(v_t^T u)}{\sum_t \exp(v_t^T u)} \tag{8}$$

$$s = \sum_t a_t h_t \tag{9}$$

As shown in Equation 7, the deep learning attribution system 104 feeds the hidden state vectors 412 for each touchpoint ($h_t$) through a one-layer multilayer perceptron (MLP) to determine $v_t$ as a hidden representation of $h_t$. Using Equation 8, the deep learning attribution system 104 measures the importance of each touchpoint in the training touchpoint sequence as the similarity of $v_t$ with touchpoint context vector u to determine a normalized importance weight (i.e., $a_t$) using, for example, a softmax function. Of note, by design $a_t>0$. Indeed, the advantage of this construction is that each touchpoint contribution has a positive effect on conversion.

Upon determining the attention weights 418 for each touchpoint, using Equation 9, the deep learning attribution system 104 computes the touchpoint sequence representation 422 (i.e., s) as the weighted sum vector of the touchpoint representation (e.g., the weighted hidden state vectors 420) based on the non-negative weights.

As mentioned previously, in various embodiments, the touchpoint sequence representation 422 is a high-level representation of a user's touchpoint journey generated by combining hidden outputs and attention weights. In some embodiments, the deep learning attribution system 104 adds padding (e.g., extra zeros) to the end of the touchpoint sequence representation 422 to obtain a uniform vector length, such that each touchpoint sequence representation 422 is the same length regardless of the number of touchpoints in the training touchpoint sequence.

As shown in FIG. 4A, the deep learning attribution system 104 classifies the touchpoint sequence representation 422. For instance, the deep learning attribution system 104 feeds the touchpoint sequence representation 422 to the classification layer 424, which predicts whether the input training touchpoint sequence results in a conversion based on the touchpoint sequence representation 422 (e.g., based on the weighted combination of all touchpoint input states).

More particularly, in one or more embodiments, the classification layer 424 transforms the touchpoint sequence representation 422 to a number ranging between zero and one (i.e., 0-1). The transformed number indicates the probability that the training touchpoint sequence resulted in conversion. In some embodiments, the transformed number is a conversion prediction 426 (i.e., p). In alternative embodiments, the conversion prediction 426 includes a touchpoint (and/or the media channel to trigger the touchpoint) that, when added to the input training touchpoint sequence, has the highest conversion probability.

More particularly, in various embodiments, the deep learning attribution system 104 applies the following formula shown in Equation 10 to determine the conversion prediction 426 (i.e., p).

$$p = \text{sigmoid}(\sigma(W_c\%s) + b_c) \quad (10)$$

In Equation 10, $W_c \in \mathbb{R}^{v_h}$ and $\sigma(\cdot)$ represent a nonlinear activation function, such as a rectified linear unit (ReLU) where $\sigma(x) = \max(0, x)$. Notably, conventional binary classification problems where the probability for predicting the sequence of a positive path is usually the sigmoid function for a linear combination of features. In contrast, when determining touchpoint attributions to predict conversion, the probability for users to have a conversion is often greater for users with at least some exposure to an entity (e.g., touchpoints are present for the user) than for users for which there is no exposure (e.g., no touchpoint observations). Thus, in some embodiments, the contributions of touchpoint for conversion are considered to be positive. Accordingly, the ReLU activation function mathematically can provide these nonnegative constraints.

As shown in FIG. 4A, the touchpoint attribution attention neural network 400a includes a loss layer 428 that provides feedback 430 to train various layers of the touchpoint attribution attention neural network 400a. In one or more embodiments, the loss layer 428 includes a loss model to determine an amount of loss (i.e., training loss), which is used to train the touchpoint attribution attention neural network 400a. For example, the loss layer 428 determines training loss by comparing the conversion prediction 426 (i.e., s) to a ground truth. In many embodiments, the ground truth is the conversion indicator included in the touchpoint path. In this manner, the loss layer 428 compares the conversion prediction 426 for a training touchpoint sequence in a touchpoint path to the corresponding conversion indicator in the same training touchpoint path.

As mentioned above, the conversion indicator can be positive or negative. If the conversion indicator is positive, the training touchpoint sequence resulted in conversion, having a value of one (i.e., 1). If, however, the conversion indicator is negative, the training touchpoint sequence is still unconverted, having a value of zero (i.e., 0). In one or more embodiments, the difference between the conversion prediction 426 (e.g., between 0-1) and the conversion indicator (e.g., either 0 or 1) is utilized to determine the amount of loss for the training touchpoint sequence. A greater difference indicates a larger loss amount.

The deep learning attribution system 104 trains the touchpoint attribution attention neural network 400a via back propagation until overall loss is minimized. Equation 11 shows a total loss for all training touchpoint paths 434 used to train the touchpoint attribution attention neural network 400a. In particular, Equation 11 includes the negative log probability of the correct labels (e.g., ground truth conversion indicators) as the training loss for all paths in the dataset (e.g., the training touchpoint paths 434).

$$L = -\sum_{path} \log(p) \quad (11)$$

In various embodiments, as shown, the deep learning attribution system 104 provides the training loss as feedback 430 to the tunable layers of the touchpoint attribution attention neural network 400a. Indeed, the deep learning attribution system 104 provides the feedback 430 to the embedding layer 406, the RNN/LSTM layer 410, the attention layer 414, and the classification layer 424. The deep learning attribution system 104 can modify parameters/weights for these layers based on the training loss (e.g., to minimize the training loss). In this manner, under supervised learning, the deep learning attribution system 104 can train the touchpoint attribution attention neural network 400a to distinguish important and unimportant features of touchpoints. Indeed, the deep learning attribution system 104 trains the touchpoint attribution attention neural network 400a to predict accurate conversions that match corresponding ground truth conversion indicators for touchpoint paths.

In addition, each of the tunable layers use the feedback 430 to train various internal components and parameters. For example, in one or more embodiments, the embedding layer 406 uses the feedback 430 to derive weights and parameters of the embedding matrix (i.e., $W_e$). In various embodiments, the attention layer 414 uses the feedback 430 to derive weights and parameters of the touchpoint context vector 416 (i.e., u). In additional embodiments, the attention layer 414 uses the feedback 430 to derive the tunable parameters $W_v$ and $b_v$ shown in Equation 7.

The deep learning attribution system 104 can conclude training when the touchpoint attribution attention neural network 400a converges and/or the total training loss amount is minimized. As a result, the trained touchpoint attribution attention neural network 400a can accurately predict when a touchpoint sequence will result in a conversion as well as the relative significance (i.e., touchpoint attribution) of each touchpoint in the touchpoint sequence. In some embodiments, the deep learning attribution system 104 can reserve a portion of the training data (e.g., 20% of the training touchpoint paths 434) for testing purposes to ensure that the touchpoint attribution attention neural network 400a is properly trained.

As mentioned above, FIG. 4B provides a variation to training the touchpoint attribution attention neural network 400a described with respect to FIG. 4A. To illustrate, FIG. 4B includes a time-decayed touchpoint attribution attention neural network 400b. In particular, the time-decayed touchpoint attribution attention neural network 400b adds a time-decay parameter 440 to the attention layer 414. The time-decay parameter 440 incorporates time lag (shown as $T_t$) between when a user interacts with a touchpoint and when conversion occurs (or a set time after one or more touchpoints when conversion does not occur) as well as a decay parameter (shown as $\lambda$).

To add additional context, in the field of natural language processing, an order between words is relative and bi-directional. In contrast, in touchpoint attribution, even though two touchpoints are located close to each other in a touchpoint sequence, the addition of time information can cause these dependencies to vary dramatically. For example, a long time gap in a touchpoint pair affects the dependency of the pair differently compared with a shorter time gap. Accordingly, adding the time-decay parameter 440 to the attention layer 414 during training controls for delays in time between touchpoints and/or a conversion.

To illustrate, each touchpoint in a training touchpoint sequence includes time information (e.g., a timestamp) indicating when the touchpoint occurred. In addition, the conversion indicator associated with the training touchpoint sequence also includes a conversion timestamp. Using the time information, the deep learning attribution system 104 can employ the time-decay parameter 440 to further train the attention layer 414 to determine attention weights 418.

More particularly, the time-decay parameter 440 can indicate the time gap difference between the time of a touchpoint and an end time (e.g., conversion timestamp) of the training touchpoint sequence, where the touchpoint time gap is represented as $T_t$. The smaller the touchpoint time gap, the closer the touchpoint is to the end time. Using this metric, the attention layer 414 can bias the attention weights 418 to decrease a touchpoint's influence as the touchpoint time gap increases (e.g., the touchpoint occurs farther away from the end time). Indeed, the attention layer 414 can penalize one or more attention weights based on a non-increasing time decay function.

To further illustrate, Equations 12-14, shown below, provide an example formula for the attention layer 414 to determine the attention weights 418 using the time-decay parameter 440, the weighted hidden state vectors 420, and the touchpoint sequence representation 422. Notably, Equation 12 corresponds to Equation 7, Equation 13 modifies Equation 8 by adding the time-decay parameter 440 (i.e., $\lambda T_t$), which is made up of a decay parameter (i.e., $\lambda$) and the touchpoint time gap (i.e., $T_t$). In addition, Equation 14 corresponds to Equation 9, but is based on the time-decayed attention weights of Equation 13.

$$v_t = \tanh(W_v h_t + b_v) \quad (12)$$

$$a_t = \frac{\exp(v_t^T u - \lambda T_t)}{\sum_t \exp(v_t^T u - \lambda T_t)} \quad (13)$$

$$s = \sum_t a_t h_t \quad (14)$$

As shown in Equation 13 as well as in FIG. 4B, the deep learning attribution system 104 subtracts the time-decay parameter 440 when determining attention weights 418 because the decay parameter (i.e., $\lambda$) is positive (e.g., $\lambda > 0$). As a result, the larger the touchpoint time gap for a touchpoint, the greater the penalty to the touchpoint, and the less influence the touchpoint will have towards a conversion.

Further, in one or more embodiments, the decay parameter can be based on domain knowledge. In alternative embodiments, the decay parameter is learned from the data through training. Indeed, the attention layer 414 can use the feedback 430 (based on the training loss) to train the decay parameter to learn optimal decay parameters (e.g., linear, logarithmic, or exponential-based) that result in improved attention weights.

As mentioned above, in additional or alternative embodiments, the deep learning attribution system 104 incorporates a user bias control model into the touchpoint attribution attention neural network, which the deep learning attribution system 104 jointly trains with the tunable layers. To illustrate, FIG. 4C includes a fused touchpoint attribution attention neural network 400c that includes a user bias control model 450 (in addition to the layers previously described). Indeed, the fused touchpoint attribution attention neural network 400c in FIG. 4C can include the touchpoint attribution attention neural network 400a described in connection with FIG. 4A or the time-decayed touchpoint attribution attention neural network 400b described in connection with FIG. 4B.

In one or more embodiments, the user bias control model 450 reduces media effect biases between user-related attributes and characteristics with respect to conversions. For instance, the user bias control model 450 learns which user attributes are tied to which touchpoints. For example, the same touchpoint in the same touchpoint sequence may have differing effects on users of different ages. By using the user bias control model 450, the deep learning attribution system 104 can control for variables that affect conversion predications and touchpoint attributions.

The user bias control model 450 can reduce user-related bias based on time-independent variables (e.g., user control variables, such as the duration of exposure, age, gender, or location of users). For example, as shown in FIG. 4C, the deep learning attribution system 104 can feed user profile data 460 (i.e., training user profile data) to the user bias control model 450 during training. The deep learning attribution system 104 can obtain the user profile data 460 from a variety of sources, such as a user database that maintains user profiles.

As also shown, the user bias control model 450 includes a user profile encoding layer 452 and fully-connected layers 456a-c. While the user bias control model 450 is shown as a deep learning neural network for user control variable learning, the deep learning attribution system 104 can employ another type of model within the fused touchpoint attribution attention neural network 400c. For example, the deep learning attribution system 104 can utilize any type of logical machine-learning regression model.

In various embodiments, the user profile data 460 provided to the user bias control model 450 during training corresponds to a provided touchpoint path. As described above, training touchpoint paths 434 are generated from actual user interactions. In some cases, the attribution weights for touchpoints could be skewed by static user-related characteristics and attributes. Indeed, user-related variables could affect the conversion rate distribution of the touchpoints. Accordingly, the user profile data 460 provides additional data to the user bias control model 450 that directly corresponds to the training touchpoint paths 434 (shown as the dashed line).

As mentioned above, the user bias control model 450 includes a user profile encoding layer 452. In one or more embodiments, the user profile encoding layer 452 utilizes one-hot encoding to encode the static user profile data 460 to indicate the presence of a particular characteristic. For example, if the first control variable is age, the user profile encoding layer 452 can create an age variable vector that has entries corresponding to each age or age ranges (e.g., Entry 0:0-14 years old, Entry 1:15-29 years old, Entry 3:30-44 years old, etc.). The user profile encoding layer 452 then encodes age variable vector by modifying the entry in which the user's age fall to one (i.e., 1) while leaving the other entries in the age variable vector as zero (i.e., 0). The user profile encoding layer 452 can employ other similar and/or different encoding techniques for other user control variables.

The user profile encoding layer 452 can output a series of encoded user control vectors 454, shown as $c_1, c_2, \ldots c_T$, in the user bias control model 450 of the fused touchpoint attribution attention neural network 400c. Using the encoded user control vectors 454 as input, the user bias control model 450 transforms the input through one or more of the fully-connected layers 456a-c into a user bias control representation 458 (i.e., v). In one or more embodiments, the fully-connected layers 456a-c are dense layers trained to capture the underlying structure as well as produce a sophisticated feature representation vector of the user control variables (e.g., the user bias control representation 458). Indeed, the fully-connected layers 456a-c can identify latent features of the user control variables that influence conversion.

The user bias control representation 458 is a time-independent representation of the user profile data 460 for a user that influences a corresponding training touchpoint sequence of the user. For instance, even though the user bias control representation 458 may reflect user characteristics (such as age), these characteristics are static categories that do not vary based on timing within a digital content campaign or a sequence of touchpoints in a digital content campaign. The user bias control representation 458 is a summation vector of each of the characteristics that affect the conversion probability of the training touchpoint sequence for the corresponding user. In one or more embodiments, the user bias control model 450 outputs the user bias control representation 458 as a numerical value or score.

In one or more embodiments, the deep learning attribution system 104 combines the user bias control representation 458 (i.e., v) with the touchpoint sequence representation 422 (i.e., s) described above. For instance, as shown in the fused touchpoint attribution attention neural network 400c, the deep learning attribution system 104 concatenates the user bias control representation 458 with the touchpoint sequence representation 422 and provides the concatenated representation to the classification layer 424.

Similar to the classification layer 424 described above with respect to FIG. 4A, in the fused touchpoint attribution attention neural network 400c, the classification layer 424 predicts a conversion probability given the input training touchpoint sequence combined with corresponding user control variables. The output of the classification layer 424 is a conversion prediction 426 (i.e., p), as described above.

More particularly, in the fused touchpoint attribution attention neural network 400c, the deep learning attribution system 104 applies the formula shown in Equation 15 to determine the conversion prediction 426 (i.e., p).

$$p = \mathrm{sigmoid}(\sigma_1(W_{c_{tp}}^T) + \sigma_2(W_{c_{mtp}}^T v) + b_c) \quad (15)$$

In Equation 15, where $\sigma_1(\cdot)$ represents the ReLU function described above with respect to FIG. 4A and Equation 10. In addition, $\sigma_2(\cdot)$ represents a similar function as $\sigma_1(\cdot)$, but the deep learning attribution system 104 replaces the touchpoint sequence representation 422 (i.e., s) with the user bias control representation 458 (i.e., v).

As shown, the deep learning attribution system 104 provides the conversion prediction 426 (i.e., p) from the loss layer 428. As described above, the loss layer 428 determines an amount of loss (i.e., training loss) which the deep learning attribution system 104 provides as part of the feedback 430 to the tunable layers of the fused touchpoint attribution attention neural network 400c (e.g., the embedding layer 406, the RNN/LSTM layer 410, the attention layer 414, and the classification layer 424) via back propagation.

In addition, the loss layer 428 back propagates the same feedback 430 to the user bias control model 450. For example, the deep learning attribution system 104 trains the fully-connected layers 456a-c using the training loss included in the feedback 430. Also, in addition to tuning the weights and parameters with respect to the touchpoint sequence representation 422 (i.e., s) in the classification layer 424, the classification layer 424 employs the feedback 430 to also tune the weights and parameters with respect to the user bias control representation 458 (i.e., v).

Overall, the deep learning attribution system 104 jointly trains the fused touchpoint attribution attention neural network 400c by simultaneously tuning the tunable layers as well as the user bias control model 450. The deep learning attribution system 104 can jointly train the fused touchpoint attribution attention neural network 400c until conversion prediction probabilities are maximized, total loss is minimized, and/or the fused touchpoint attribution attention neural network 400c converges.

FIGS. 4A-4C described various embodiments of training a touchpoint attribution attention neural network. Accordingly, the actions and algorithms described in connection with FIGS. 4A-4C provide example structure for performing a step for training a touchpoint attribution attention neural network that determines attention weights based on the training touchpoint paths. As one example, the actions and algorithms described in training the touchpoint attribution attention neural network 400a with respect to FIG. 4A can provide structure for performing a step for training a touchpoint attribution attention neural network that determines attention weights based on training touchpoint paths.

Moreover, the actions and algorithms described in training the time-decayed touchpoint attribution attention neural network 400b with respect to FIG. 4B can provide structure for performing the step for training the time-decayed touchpoint attribution attention neural network 400b that determines attention weights based on training touchpoint paths. For example, these actions include determining a time-decay parameter for a first training touchpoint of a first training touchpoint path of the training touchpoint paths, where the time-decay parameter is based on an elapsed time between a first time of the first training touchpoint and an end time of the first training touchpoint path, as described above. Further, these actions include training a touchpoint attention layer within the touchpoint attribution attention neural network 400b to learn a time-decayed attention weight for the first training touchpoint based on the time-decay parameter, as described above.

In another example, the actions and algorithms of training the touchpoint attribution attention neural network 400c with respect to FIG. 4C can provide structure for performing the step for training the touchpoint attribution attention neural network 400c that determines attention weights based on training touchpoint paths. For example, these actions include jointly training a user bias control machine-learning model together with a touchpoint attention layer to generate attention weights of training touchpoints of the training touchpoint paths, as described above.

Figure 5A:
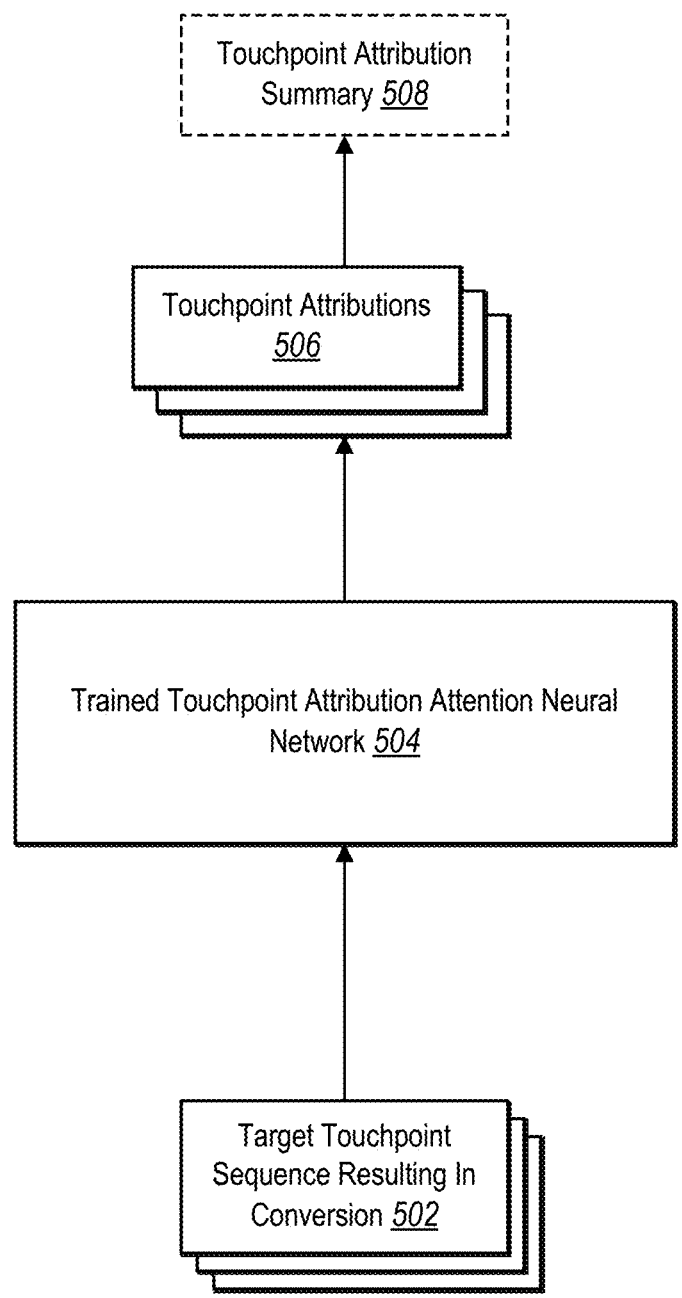
FIG. 5A illustrates employing a trained touchpoint attribution attention neural network to generate touchpoint attributions in accordance with one or more embodiments.
Figure 5B:
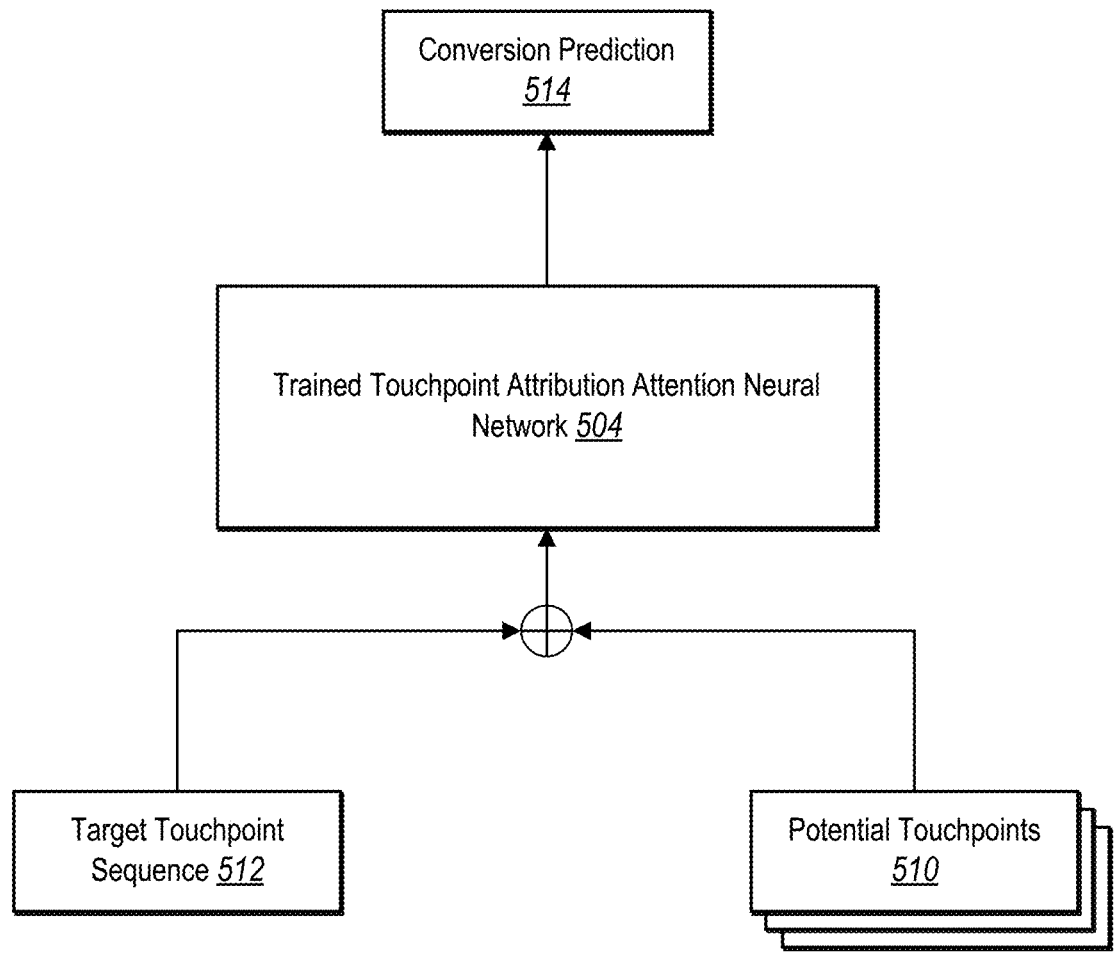
FIG. 5B illustrates employing a trained touchpoint attribution attention neural network to generate conversion predictions in accordance with one or more embodiments.

Turning now to FIGS. 5A and 5B, additional detail is provided regarding employing a trained touchpoint attribution attention neural network to determine touchpoint attributions and predict conversions for target touchpoint sequences. In particular, FIG. 5A illustrates the deep learning attribution system 104 employing the trained touchpoint attribution attention neural network to determine touchpoint attributions for a target touchpoint sequence. FIG. 5B illustrates the deep learning attribution system 104 employing the trained touchpoint attribution attention neural network to determine conversion predictions for target touchpoint sequences.

As shown, FIGS. 5A and 5B include a trained touchpoint attribution attention neural network 504. The trained touchpoint attribution attention neural network 504 can include any of the embodiments of the touchpoint attribution attention neural network described above. For example, the trained touchpoint attribution attention neural network 504 can include a time-decay parameter and/or a user bias control model. Notably, the trained touchpoint attribution attention neural network 504 does not include the loss layer, and thus, the classification layer is the final layer of the trained touchpoint attribution attention neural network 504.

As shown in FIG. 5A, the deep learning attribution system 104 feeds a target touchpoint sequence 502 (e.g., a touchpoint sequence resulting in conversion) to the trained touchpoint attribution attention neural network 504. For example, the target touchpoint sequence 502 corresponds to a digital content campaign for a product where a user purchased the product after being served a touchpoint associated with the product. In another example, the deep learning attribution system 104 feeds multiple target touchpoint sequences to the trained touchpoint attribution attention neural network 504.

The deep learning attribution system 104 analyzes each touchpoint in the target touchpoint sequence 502 using the learned weights and parameters of the trained touchpoint attribution attention neural network 504. For instance, in one or more embodiments, the deep learning attribution system 104 utilizes the touchpoint encoding layer to encode the target touchpoint sequence, the embedding layer to transform the encoded touchpoints (e.g., $x_t$) to dense vectors (e.g., $e_t$), and the RNN/LSTM layer to create hidden state vectors (e.g., $h_t$) from the dense vectors. Further, the deep learning attribution system 104 utilizes the attention layer to determine touchpoint attention weights (e.g., $a_t$) for each touchpoint in the target touchpoint sequence 502. For example, the deep learning attribution system 104 applies the trained touchpoint context vector 416 (e.g., u) to the hidden state vectors, as described above, to determine touchpoint attention weights.

As shown in FIG. 5A, the trained touchpoint attribution attention neural network 504 outputs the touchpoint attention weights for the target touchpoint sequence 502 as touchpoint attributions 506. Accordingly, the touchpoint attributions 506 indicate the relative significance and conversion importance of each touchpoint in the target touchpoint sequence 502.

Figure 6A:
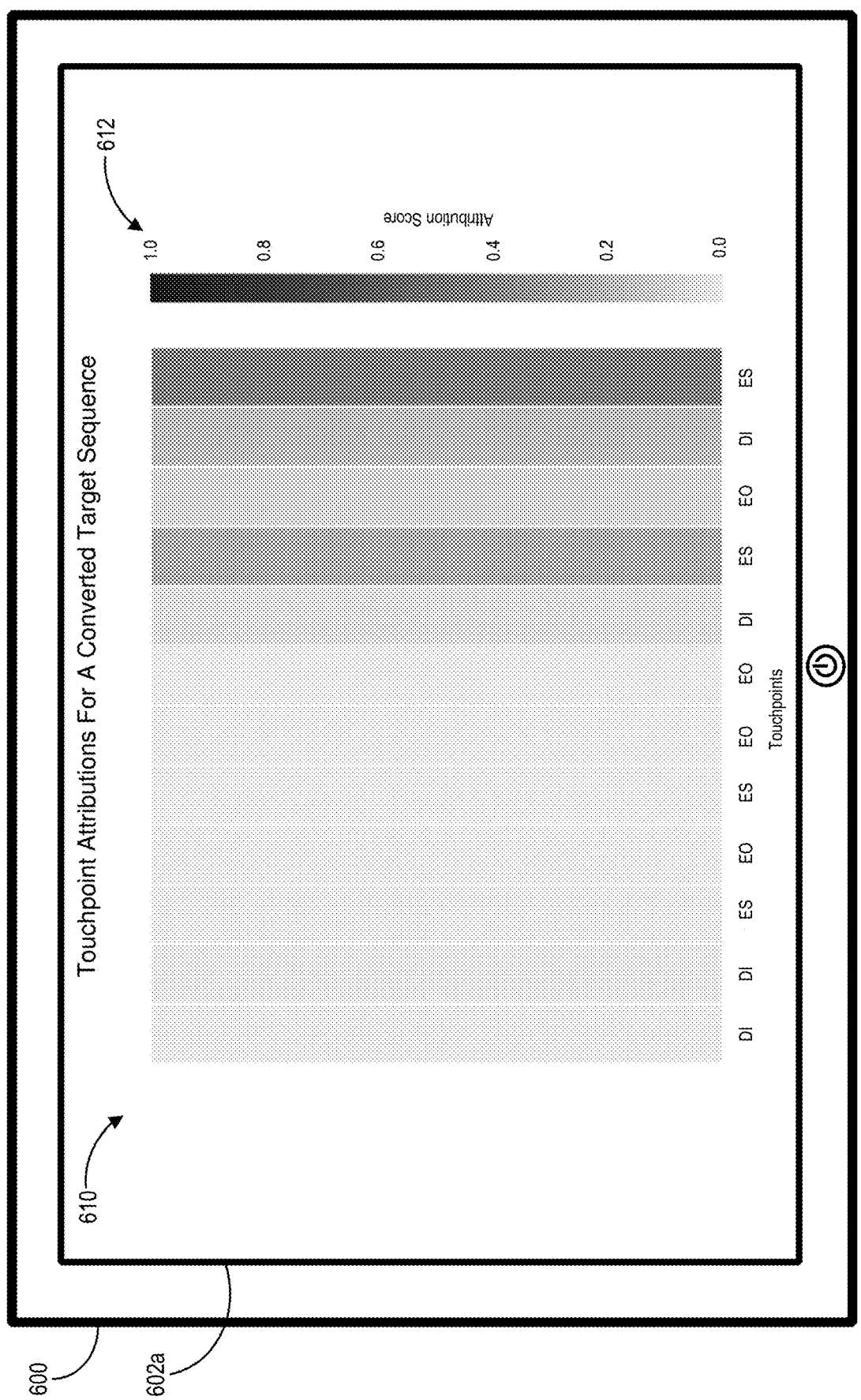
FIGS. 6A-6C illustrate an administrator client device displaying touchpoint attribution results within a graphical user interface in accordance with one or more embodiments.

In some embodiments, the deep learning attribution system 104 provides the determined touchpoint attention attributions 506 to an administrator user via an administrator client device. FIG. 6A illustrates a graphical example of providing touchpoint attention attributions 506 within a graphical user interface of a client device for a target touchpoint sequence.

Figure 6B:
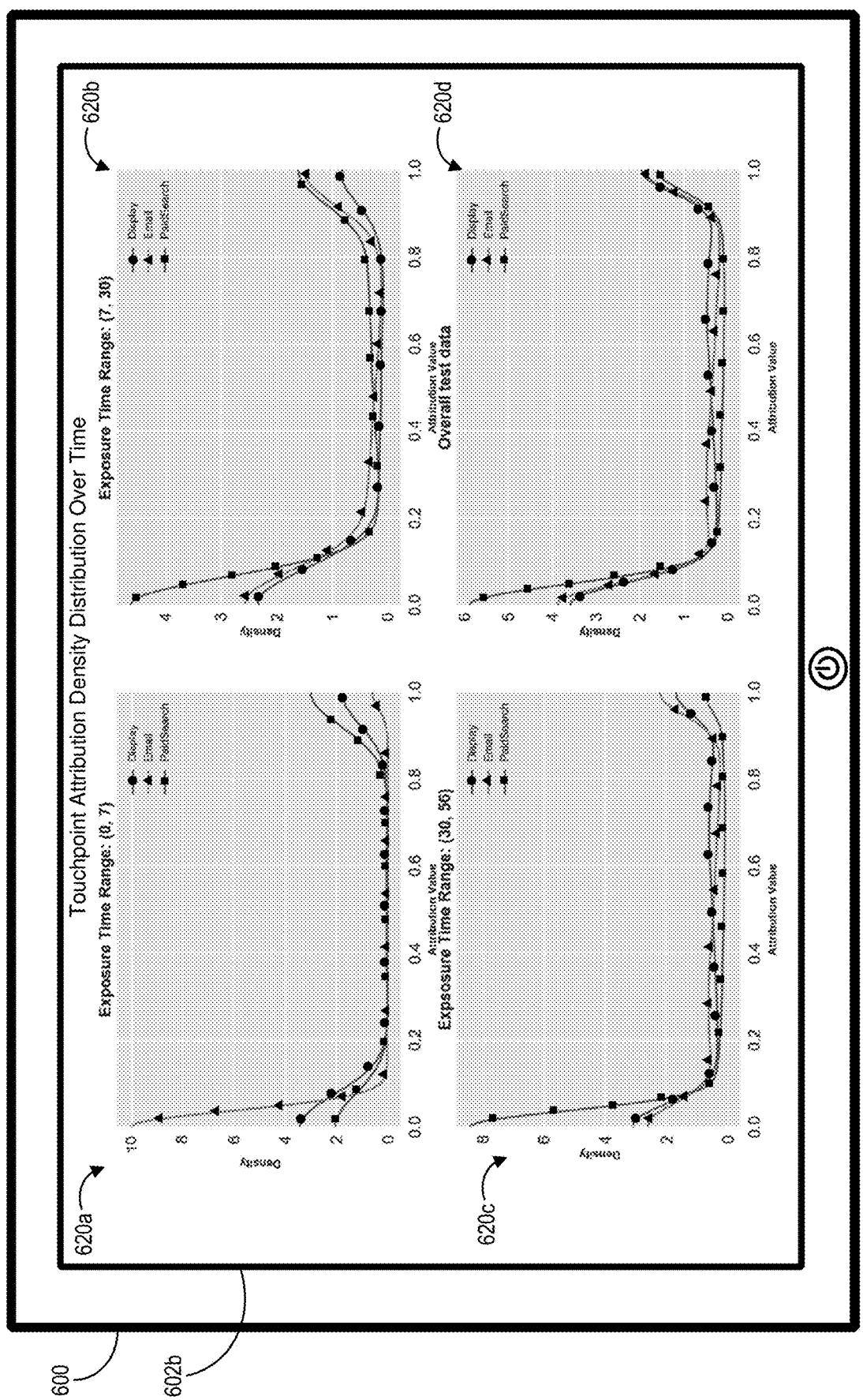
Figure 6C:
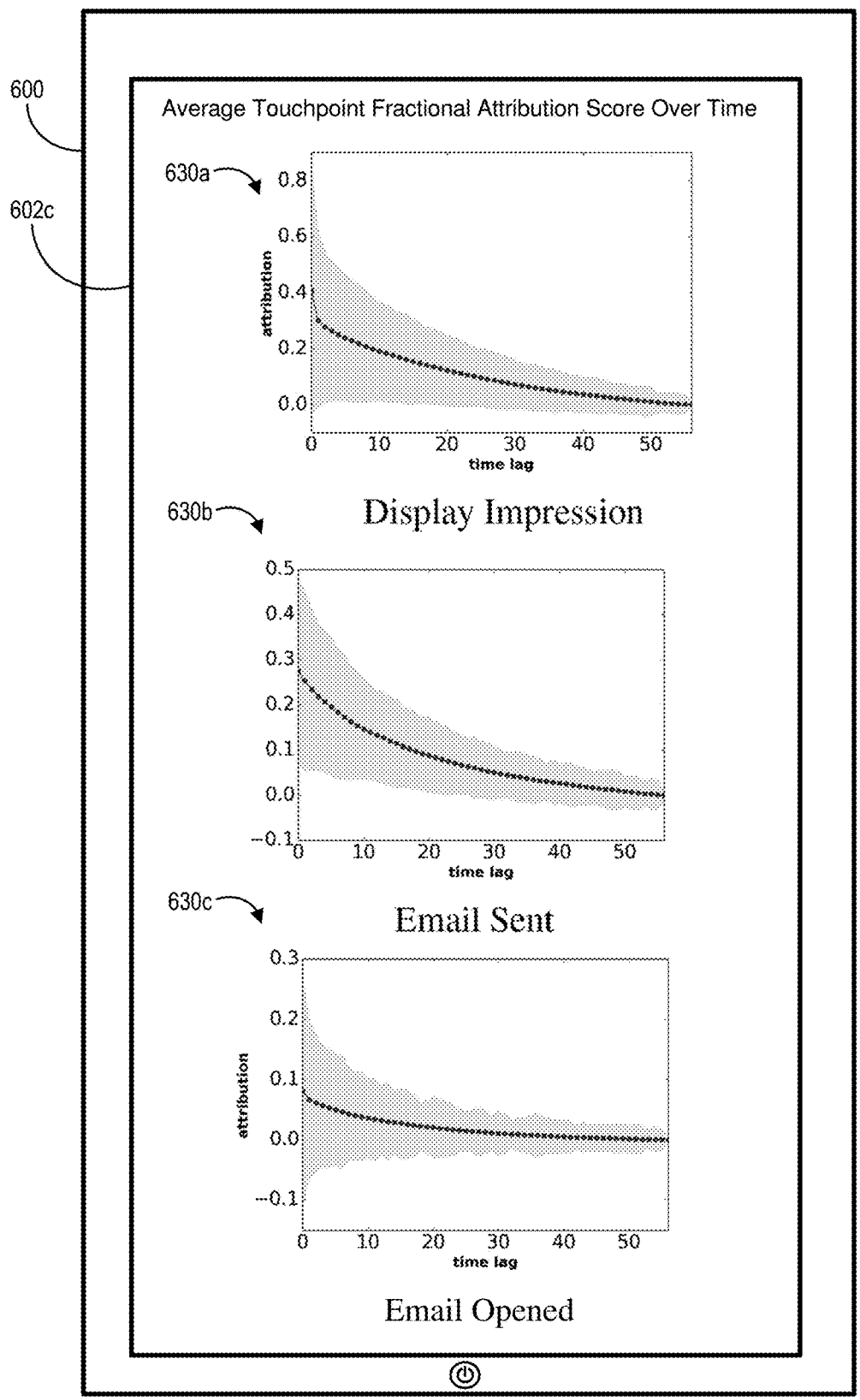

In one or more embodiments, the deep learning attribution system 104 optionally generates a touchpoint attention summary 508. For example, the deep learning attribution system 104 aggregates touchpoint attributions from across one or more digital content campaigns and provides the result to the administrator client device within a graphical user interface as a table, chart, and/or graph. FIGS. 6B and 6C illustrate various examples of providing touchpoint attention summaries within a graphical user interface of a client device for target touchpoint sequences.

As mentioned above, FIG. 5B illustrates the deep learning attribution system 104 employing the trained touchpoint attribution attention neural network to determine conversion predictions for target touchpoint sequences. For example, the deep learning attribution system 104 can provide conversion predictions for a target touchpoint sequence that has not yet resulted in a conversion (or for which an additional conversion is desired).

As shown in FIG. 5B, the deep learning attribution system 104 obtains a target touchpoint sequence 512 corresponding to a target user (e.g., touchpoint interactions by the target user) and potential touchpoints 510. In one or more embodiments, the deep learning attribution system 104 adds a potential touchpoint to the target touchpoint sequence 512 to create a first modified target touchpoint sequence. The deep learning attribution system 104 provides the first modified target touchpoint sequence to the trained touchpoint attribution attention neural network 504.

Using the various layers, as described above, the trained touchpoint attribution attention neural network 504 determines a conversion probability for the first modified target touchpoint sequence. In particular, the trained touchpoint attribution attention neural network 504 determines touchpoint attention weights for the first modified target touchpoint sequence. Then, based on the touchpoint attention weights, the trained touchpoint attribution attention neural network 504 determines a first conversion probability for the first modified target touchpoint sequence.

The deep learning attribution system 104 can repeat the process of modifying the target touchpoint sequence 512. For example, the deep learning attribution system 104 can create a second modified target touchpoint sequence by adding a different touchpoint type to the end of the sequence. Using the trained touchpoint attribution attention neural network 504, the deep learning attribution system 104 determines a second conversion probability for the second modified target touchpoint sequence.

The deep learning attribution system 104 can compare the first conversion probability to the second conversion probability. Further, the deep learning attribution system 104 can repeat the process with additional potential touchpoints 510. In one or more embodiments, the deep learning attribution system 104 identifies the highest conversion probability (and the potential touchpoint corresponding to the highest conversion probability) as the conversion prediction 514. Accordingly, in these embodiments, the conversion prediction 514 identifies which of the potential touchpoints 510 that, if next served to the target user, will most likely result in a conversion.

In some embodiments, the deep learning attribution system 104 determines that some or all of the modified target touchpoint sequences do not meet a sufficient conversion probability threshold (e.g., above 50%). Accordingly, the deep learning attribution system 104 can add additional touchpoint types to the modified target touchpoint sequences until the conversion probability threshold is satisfied. Here, the conversion prediction 514 identifies multiple touchpoints, that if next served to the target user in a specified order, most likely will yield a conversion.

In providing a recommended touchpoint type the conversion prediction 514 can also indicate a media channel. For example, if the deep learning attribution system 104 recommends an email touchpoint, the conversion prediction 514 can indicate to send content to the target user via email. In another example, if the deep learning attribution system 104 recommends a display impression, the conversion prediction 514 can recommend one or more digital content media channels (e.g., browser, in-app, push notification) to utilize to best trigger the recommended touchpoint. Further, in some embodiments, the deep learning attribution system 104 can automatically send content to the target user via the one or more recommended media channels.

In one or more embodiments, when the trained touchpoint attribution attention neural network 504 includes the trained time-decay parameter, the deep learning attribution system 104 can include a recommended time to provide content to the target user in the conversion prediction 514. For example, the deep learning attribution system 104 employs the trained time-decay parameter to identify a time or window of time that optimizes the likelihood of conversion for a potential touchpoint. In additional embodiments, the deep learning attribution system 104 can automatically provide digital content, as described above, to a target user during the optimal time window as well as via a recommended media channel.

More particularly, in one or more embodiments, the media attribution system 104 provides multiple potential times to the trained touchpoint attribution attention neural network 504 that correspond to a potential touchpoint to add to a target touchpoint sequence. For instance, the trained touchpoint attribution attention neural network 504 can utilize the time-decay parameter to generate conversion predictions for each potential time. The media attribution system 104 then selects the potential time that yields the highest probability of conversion, which the media attribution system 104 includes in the conversion prediction 504.

In additional or alternative embodiments where the trained touchpoint attribution attention neural network 504 includes the trained user bias control model, the deep learning attribution system 104 can also provide user profile data of the target user to the trained touchpoint attribution attention neural network 504. Using the user profile data, as described above, the deep learning attribution system 104 can provide a conversion prediction 514 that accounts for characteristics and attributes of the target user that may otherwise skew the conversion prediction 514, as explained above.

Overall, the deep learning attribution system 104 can intelligently employ the trained touchpoint attribution attention neural network 504 to detect and allocate the importance of each touchpoint in a touchpoint sequence in a probabilistic way. In this manner, the deep learning attribution system 104 can properly attribute the influence of all the touchpoints in a touchpoint sequence, rather than just the first or last touchpoint before a conversion. Moreover, the deep learning attribution system 104 can flexibly and accurately consider interactions between different media channels, temporal effects, user characteristics, and control variables.

Turning now to FIGS. 6A-6C, additional detail is provided with respect to providing touchpoint attribution results within a graphical user interface to a client device. Each of FIGS. 6A-6C includes a client device 600. For example, in one or more embodiments, the client device 600 can represent an administrator client device. Additionally, each client device 600 includes a graphical user interface.

To illustrate, FIG. 6A illustrates a first graphical user interface 602a of a heatmap 610 portraying the contribution of each touchpoint in a specific target touchpoint sequence (i.e., a target touchpoint path that includes a conversion). The deep learning attribution system 104 can convert the touchpoint attributions determined for a target touchpoint sequence for a user into the heatmap 610. Alternatively, the deep learning attribution system 104 can provide numerical values for each touchpoint attribution in a target touchpoint sequence.

As shown, the x-axis of the heatmap 610 indicates touchpoints as they occurred in the target touchpoint sequence (where time progresses from left to right). For reference, the touchpoints are abbreviated as "DI" for display impression, "ES" for email sent, and "EO" for email opened. To the right of the heatmap 610, the graphical user interface shows an attribution score heat index 612, where a darker color indicates a higher attribution score. Indeed, the darker the color for a touchpoint, the higher touchpoint attribution/conversion influence.

Using the attribution score heat index 612, the heatmap 610 shows the touchpoints in the target touchpoint sequence are scored according to their attribution scores. As shown, the email sent at the end of the sequence had the largest influence (e.g., ~45% attribution score). The third email sent near the end of the target touchpoint sequence had the second largest influence (e.g., ~25% attribution score). In contrast, the first two emails sent at the beginning of the target touchpoint sequence had almost no influence on conversion.

FIG. 6B shows a second graphical user interface 602b that includes touchpoint attribution density distributions over time for three different touchpoints provided over different media channels (e.g., display, email, paid search). In particular, FIG. 6B includes aggregate curves for each of the three touchpoints showing a comparison of density to attribution values at three separate time intervals 620a-c (e.g., 0-7 days, 7-30 days, 30-56 days) as well as an overall time interval 620d. In addition, the area under the curve (i.e., AUC) of the density function represents the probability of getting specific attribution values between the displayed range.

As shown in the first time interval 620a of 0-7 days, the paid search touchpoints have a high attribution value towards 1.0, which indicates that right before a conversion in the first seven days, paid search will have a large influence leading to conversion. However, for the second time interval 620b of 7-30 days and the third time interval 620c of 30-56 days, the paid search touchpoints had a lesser influence for conversion than the other two touchpoints (e.g., the influence of paid search decreases for long exposures of time).

FIG. 6C illustrates a third graphical user interface 602c that shows the effect of time-decay on touchpoint attribution scores for various touchpoints (e.g., display impressions, emails opened, and emails sent) represented by an average touchpoint fractional attribution over time. In particular, FIG. 6C shows touchpoint graphs 630a-c where the mean fractional touchpoint attribution score is measured along the y-axis. As further described below, the fractional touchpoint attribution score is a measure of importance toward conversion. The higher the fractional touchpoint attribution score towards the lower time lag, the greater the influence a touchpoint has toward conversion.

In each of the touchpoint graphs 630a-c, the mean fractional touchpoint attribution scores decrease as time lag increases, which confirms the time-decay property for touchpoint attribution scores (e.g., a touchpoint that occurs closer to the time of conversion is more influential than a touchpoint that occurs farther away in time from conversion). Indeed, when the time lag (e.g., the difference between touchpoint timestamp and the end timestamp) increases, the attribution for each touchpoint decreases.

In addition, each of the touchpoint graphs 630a-c shows the amount of touchpoint attribution score variance with respect to the time lag, shown as the shaded area. As shown, in each case, the average variance has a decreasing trend as the time lag increases. Indeed, the most recent exposure in each touchpoint graphs 630a-c shows the greatest conversion influence contribution. Further disclosure with respect to fractional scores is provided below.

As mentioned above, one or more embodiments of the deep learning attribution system 104 outperform conventional systems in head-to-head evaluations with respect to touchpoint attribution determinations as well as conversion prediction accuracy. The following provides real-world results of evaluations performed by researchers.

In particular, the researchers employed the same open-source machine learning framework and coding language with all deep model implementations. In addition, the researchers ran each of the experiments on the same CPU and GPU (e.g., Tesla K80). For models that included LSTM, the researchers employed stochastic gradient descent for training. With respect to deep model learning, the researchers selected 64-dimensions for both the hidden size vectors and touchpoint contextual vectors. Further, the researchers employed three hidden layers. Lastly, during each of the training processes, the researchers held out validation data for hyper parameter tuning, and they stopped the training process for each model when validation loss no longer improved.

For reference, the researchers compared a variety of known models. In particular, the researchers compared three commonly used attribution models: last-touch attribution (LTA), logistical regression (LR), and hidden Markov model (HMM). As a summary, last-touch attribution is a rule-based attribution model that allocates all attribution to the last touchpoint before a conversion. Logistic regression is a commonly used algorithmic attribution model that is based on a sequence of one-hot representations of touchpoints. Hidden Markov model incorporates the effect of preceding touchpoint exposures.

In addition, the researchers compared various embodiments of the deep learning attribution system 104 disclosed herein. For instance, the researchers compared three embodiments of the touchpoint attribution attention neural network. The first embodiment corresponds to the touchpoint attribution attention neural network and attention mechanism (e.g., as described in connection with FIG. 4A), which is labeled below as "DNAMTA" for deep neural network with attention multi-touch attribution model. The second embodiment corresponds to the time-decayed touchpoint attribution attention neural network (e.g., described in connection with FIG. 4B), labeled as Time-Decayed DNAMTA. The third embodiment corresponds to a fused time-decayed touchpoint attribution attention neural network (e.g., that combines the time-decayed touchpoint attribution attention neural network described in connection with FIG. 4B and the fused touchpoint attribution attention neural network described in connection with FIG. 4C). The fused time-decayed touchpoint attribution attention neural network is labeled as Fused DNAMTA.

With respect to touchpoint data, the researchers ran the experiments on a large event dataset of a marketing organization having three primary media channels (display, email, and paid search) with six different touchpoints (e.g., display click, display impression, email click, email sent, email open, and paid search). The dataset included over 425,000 records spanning 57 days. Each record included a touchpoint sequence of a user and whether the touchpoint sequence ended with a conversion. Records that ended in conversion were labeled as a positive path. Otherwise, the records were labeled as a negative path.

Due to the heavy imbalanced distribution of positive and negative paths in the dataset, the researchers down sampled the negative path records to roughly balance the magnitude/number of positive paths. In addition, the researchers randomly split this data into two sets: 80% for training and 20% for testing. The results shown below in Tables 1-3, which are from comparing the models, are based on the test dataset.

Regarding the evaluation criteria, the researchers employed various criteria for evaluating attribution models including predictive accuracy. In particular, the researchers employed Receiver Operating Characteristic (ROC) curves and Area Under the Curve (AUC) measurements to evaluate each model's binary classifiers performance.

Table 1, shown below, reports the prediction performance of all attribution models based on using the test dataset. As shown, the DNAMTA fusion model successfully utilizes both time and touchpoint content dependent representation and confounding factors, and it achieves the highest prediction accuracy (i.e., 0.8187) and an Area Under Curve (AUC) value (i.e., 0.8793). In addition, by comparing the DNAMTA models with the logistic regression and the last-touch attribution model, the results show that the DNAMTA models improve prediction performance. Indeed, the DNAMTA models intelligently and accurately determine touchpoint contextual dependencies in a touchpoint sequence by properly allocating touchpoint contributions among the touchpoints.

TABLE 1

Comparison Summary Of Model Prediction Performance

|  | LTA | LR | HMM | DNAMTA | Time-Decayed DNAMTA | Fused DNAMTA |
|---|---|---|---|---|---|---|
| Accuracy | 0.7651 | 0.7885 | 0.7655 | 0.8072 | 0.8072 | 0.8187 |
| AUC | 0.8004 | 0.8456 | 0.8005 | 0.8552 | 0.8513 | 0.8793 |

Further, as shown in Table 1, the DNAMTA models overcome shortcomings of the conventional models. For example, if both a long touchpoint sequence and a short touchpoint sequence end with the same touchpoint, these two paths will be treated as the same in the last-touch attribution model, which leads to inaccurate touchpoint attributions.

For the logistic regression, while the path representation vector considers the touchpoint content information and time information, the dimension of vectors can be dramatically high and sparse when the observation time-window grows. Thus, for the dataset, which spans over 57 days, the logistic regression feature is 342-dimensions (e.g., 57 days×6 touchpoints). As the number of dimensions grows, the computational and memory resources needed to determine attributions also grows significantly. Indeed, even at a relatively low dimension, many computers cannot provide the computational and memory resources needed to determine attributions.

In contrast, while the sequence representation of the DNAMTA models is limited to 64-dimensions, the DNAMTA models achieve better prediction performance than the logistic regression model. Thus, the DNAMTA models are more efficient than the logistic regression model. Further, the DNAMTA models are easily scalable with any size of data while still maintaining efficiency because both the number of parameters and necessary computations can be controlled independently of the size of a touchpoint sequence.

With respect to each content media channel, the researchers compared the fractional and incremental attribution scores among the models. Table 2 below provides incremental touchpoint attribution scores for the content media channels.

TABLE 2

Comparison Summary Of Incremental Attribution Scores By Channels

| | LTA | LR | DNAMTA | Time-Decayed DNAMTA | Fused DNAMTA |
|---|---|---|---|---|---|
| Display | 0.3250 | 0.3596 | 0.3691 | 0.3258 | 0.3410 |
| Email | 0.1334 | 0.1547 | 0.1687 | 0.1829 | 0.1795 |
| Paid Search | 0.2128 | 0.1622 | 0.1762 | 0.2064 | 0.2068 |
| Total | 0.6714 | 0.6765 | 0.7141 | 0.7151 | 0.7273 |

As shown in Table 2, incremental touchpoint attribution scores represent probability-based contribution scores of touchpoint attributions. Incremental touchpoint attribution scores are calculated by estimating the impact of a specific channel on the conversion probability by excluding the channel from each model and predicting the probability again. The incremental touchpoint attribution scores are the difference between these two probabilities. In addition, the incremental touchpoint attribution scores provide an estimate for a channel's impact. As shown, the results are aggregated at the channel level.

In addition, Table 3 below provides fractional touchpoint attribution scores for the content media channels. In particular, Table 3 shows normalized values of Table 2 such that the total touchpoint attribution scores sum to one (i.e., 1). Notably, the HMM score is excluded in Table 2 and Table 3 as the touchpoint attribution scores were similar to the other conventional models.

TABLE 3

Comparison Summary Of Fractional Attribution Scores By Channels

| | LTA | LR | DNAMTA | Time-Decayed DNAMTA | Fused DNAMTA |
|---|---|---|---|---|---|
| Display | 0.3919 | 0.5380 | 0.4477 | 0.3985 | 0.4111 |
| Email | 0.3826 | 0.2406 | 0.3623 | 0.3836 | 0.3717 |
| Paid Search | 0.2253 | 0.2213 | 0.1898 | 0.2177 | 0.2171 |
| Total | 1.0 | 1.0 | 1.0 | 1.0 | 1.0 |

As shown in Table 3, fractional touchpoint attribution scores are based on the corresponding incremental score. The incremental touchpoint attribution score for each channel may already account for the existence of all other channel observations, which can explain the dependent variable uncertainty. Therefore, to incorporate this information, the fractional touchpoint attribution scores normalize the incremental scores of each channel for each touchpoint sequence and aggregate the incremental touchpoint attribution contributions at the channel level.

As an alternative to determining fractional touchpoint attribution scores, attention values learned from the DNAMTA models can be used directly as fractional touchpoint attribution scores, as these scores serve as the contribution of each touchpoint after accounting for the interaction between each other. Thus, for a touchpoint sequence, the incremental touchpoint attribution score for each touchpoint in the touchpoint sequence allocates the prediction value proportionally to the corresponding attention value. Indeed, the DNAMTA models provide a novel usage of attention scores that can be incorporated with traditional touchpoint attribution score calculations.

As described above and illustrated in FIGS. 6A-6C, the media attribution system 104 can provide visual results within a graphical user interface to a client device associated with an administrator. Moreover, the media attribution system 104 can provide additional or alternative results within the graphical user interface. For example, in one or more embodiments, the media attribution system 104 can provide additional values and results, such as those included in Tables 1-3, within the graphical user interface.

Figure 7:
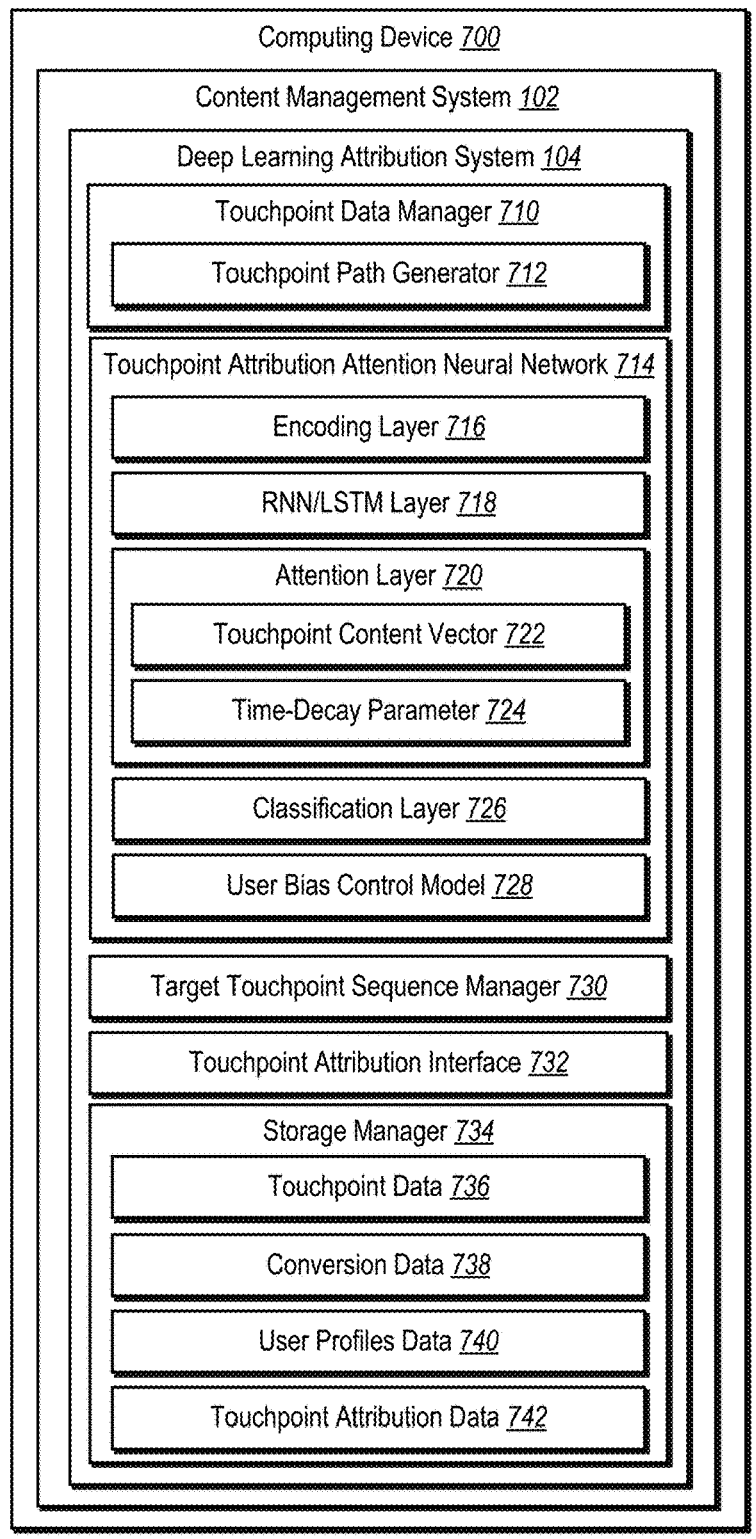
FIG. 7 illustrates a schematic diagram of a deep learning attribution system in accordance with one or more embodiments.

Referring now to FIG. 7, additional detail will be provided regarding capabilities and components of the deep learning attribution system 104 in accordance with one or more embodiments. In particular, FIG. 7 shows a schematic diagram of an example architecture of the deep learning attribution system 104 located within a content management system 102 and hosted on a computing device 700. The deep learning attribution system 104 can represent one or more embodiments of the deep learning attribution system 104 described previously.

As shown, the deep learning attribution system 104 is located on a computing device 700 within a content management system 102, as described above. In general, the computing device 700 may represent various types of computing devices (e.g., the server device 101, the third party, or the administrator client device 108). For example, in some embodiments, the computing device 700 is a non-mobile device, such as a desktop or server, or client device. In other embodiments, the computing device 700 is a mobile device, such as a mobile telephone, a smartphone, a PDA, a tablet, a laptop, etc. Additional details with regard to the computing device 700 are discussed below as well as with respect to FIG. 10.

As illustrated in FIG. 7, the deep learning attribution system 104 includes various components for performing the processes and features described herein. For example, the deep learning attribution system 104 includes a touchpoint data manager 710, a touchpoint attribution attention neural network 714, a target touchpoint sequence manager 730, a touchpoint attribution interface 732, and a storage manager 734. Each of these components is described below in turn.

As shown, the deep learning attribution system 104 includes the touchpoint data manager 710. In general, the touchpoint data manager 710 can receive, access, detect, store, copy, identify, determine, filter, remove, and/or organize touchpoint data 736. In one or more embodiments, touchpoint data includes touchpoint interactions between a user and an entity and/or product as well as metadata associated with touchpoints. In addition, the touchpoint data manager 710 can receive, access, detect, store, copy, identify, determine, filter, remove, and/or organize conversion data 738, which indicates a conversion of a product by a user. In some embodiments, the touchpoint data manager 710 can store and access the touchpoint data 736 and/or the conversion data 738 from the storage manager 734 on the computing device 700.

As shown, the touchpoint data manager 710 includes a touchpoint path generator 712. The touchpoint path generator 712 can determine, identify, analyze, and/or generate a touchpoint sequence that includes touchpoints between a given user and a given entity (and/or in connection with a given product). The touchpoint path generator 712 can include a touchpoint sequence (e.g., touchpoint data 736) and a conversion indicator (e.g., conversion data 738) for a user within a touchpoint path. Examples of touchpoint paths include a training touchpoint sequence and/or a target touchpoint sequence. The deep learning attribution system 104 can use touchpoint paths to train the touchpoint attribution attention neural network 714, as further described below.

As shown, the deep learning attribution system 104 includes the touchpoint attribution attention neural network 714. The touchpoint attribution attention neural network 714 can include a number of tunable layers, including an encoding layer 716, a RNN/LSTM layer 718, an attention layer 720, and a classification layer 726. In particular, the attention layer 720 includes a touchpoint content vector 722 that the deep learning attribution system 104 utilizes to determine attention weights for touchpoints in a touchpoint sequence with a touchpoint path. In some embodiments, the attention layer 720 also includes a time-decay parameter 724 that the deep learning attribution system 104 utilizes to determine attention weights. In various embodiments, the touchpoint attribution attention neural network 714 also includes a user bias control model 728. Each of the tunable layers, the time-decay parameter 724, and the user bias control model 728 is described above (e.g., with respect to FIGS. 4A-4C).

As described above, the deep learning attribution system 104 trains the touchpoint attribution attention neural network 714. For example, the deep learning attribution system 104 uses the training touchpoint paths mentioned above to train the touchpoint attribution attention neural network 714 to determine attention weights that reflect the relative conversion significance of each target touchpoint in a touchpoint sequence. Further, the deep learning attribution system 104 trains the touchpoint attribution attention neural network 714, via back propagation in a supervised manner, to provide accurate conversion predictions for a training touchpoint sequence, as described above.

In addition, the deep learning attribution system 104 includes the target touchpoint sequence manager 730. In one or more embodiments, the target touchpoint sequence manager 730 employs, utilizes, engages, feeds, provides, obtains, and/or uses the trained touchpoint attribution attention neural network 714 to determine touchpoint attributions and/or conversion predictions for a target touchpoint sequence. In various embodiments, the target touchpoint sequence manager 730 feeds a converted target touchpoint path (e.g., a touchpoint path having a target touchpoint sequence and a positive conversion indicator) to the trained touchpoint attribution attention neural network 714 to obtain touchpoint attributions for each touchpoint in the target touchpoint sequence, as described above. In some embodiments, the target touchpoint sequence manager 730 saves the touchpoint attribution data 742 (e.g., attention weights and/or touchpoint attributions) within the storage manager 734.

In additional embodiments, the target touchpoint sequence manager 730 provides a non-converted target touchpoint path (e.g., a touchpoint path having a target touchpoint sequence and a negative conversion indicator) to the trained touchpoint attribution attention neural network 714 to obtain one or more conversion predictions for the target touchpoint sequence, as explained earlier. For example, a conversion prediction can include a recommended touchpoint and/or digital media channel (e.g., digital distribution channel) for serving content to trigger the recommended content.

As shown in FIG. 7, the deep learning attribution system 104 includes the touchpoint attribution interface 732. In one or more embodiments, the touchpoint attribution interface 732 generates, provides, displays, analyzes, distributes, serves, aggregates, notifies, and/or updates graphical user interfaces for efficiently identifying and analyzing touchpoint attributions. For example, the touchpoint attribution interface 732 aggregates the touchpoint attribution data 742 within the storage manager 734 and provides the results to a graphical user interface of a client device associated with a user, as described above.

As also shown, the deep learning attribution system 104 includes the storage manager 734. The storage manager 734 includes touchpoint data 736, conversion data 738, user profile data 740, and touchpoint attribution data 742. The touchpoint data 736, conversion data 738, and touchpoint attribution data 742 are mentioned above. User profile data 740 can include characteristics and attributes associated with users. In one or more embodiments, the deep learning attribution system 104 utilizes the user profile data 740 to train the user bias control model 728. Further, in some embodiments, the target touchpoint sequence manager 730 utilizes the user profile data 740 to remove user-bias for a target user when determining touchpoint attributions and/or conversion predictions, as explained previously.

Each of the components 710-742 of the deep learning attribution system 104 can include software, hardware, or both. For example, the components 710-742 can include one or more instructions stored on a computer-readable storage medium and executable by processors of one or more computing devices, such as a client device or server device. When executed by the one or more processors, the computer-executable instructions of the deep learning attribution system 104 can cause the computing device(s) to perform the feature learning methods described herein. Alternatively, the components 710-742 can include hardware, such as a special-purpose processing device to perform a certain function or group of functions. Alternatively, the components 710-742 of the deep learning attribution system 104 can include a combination of computer-executable instructions and hardware.

Furthermore, the components 710-742 of the deep learning attribution system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 710-742 may be implemented as a stand-alone application, such as a desktop or mobile application. Furthermore, the components 710-742 may be implemented as one or more web-based applications hosted on a remote server. The components 710-742 may also be implemented in a suite of mobile device applications or "apps." To illustrate, the components 710-742 may be implemented in an application, including but not limited to ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", and "ADOBE TARGET" are either registered trademarks or trademarks of Adobe Systems Incorporated in the United States and/or other countries.

Figure 8:
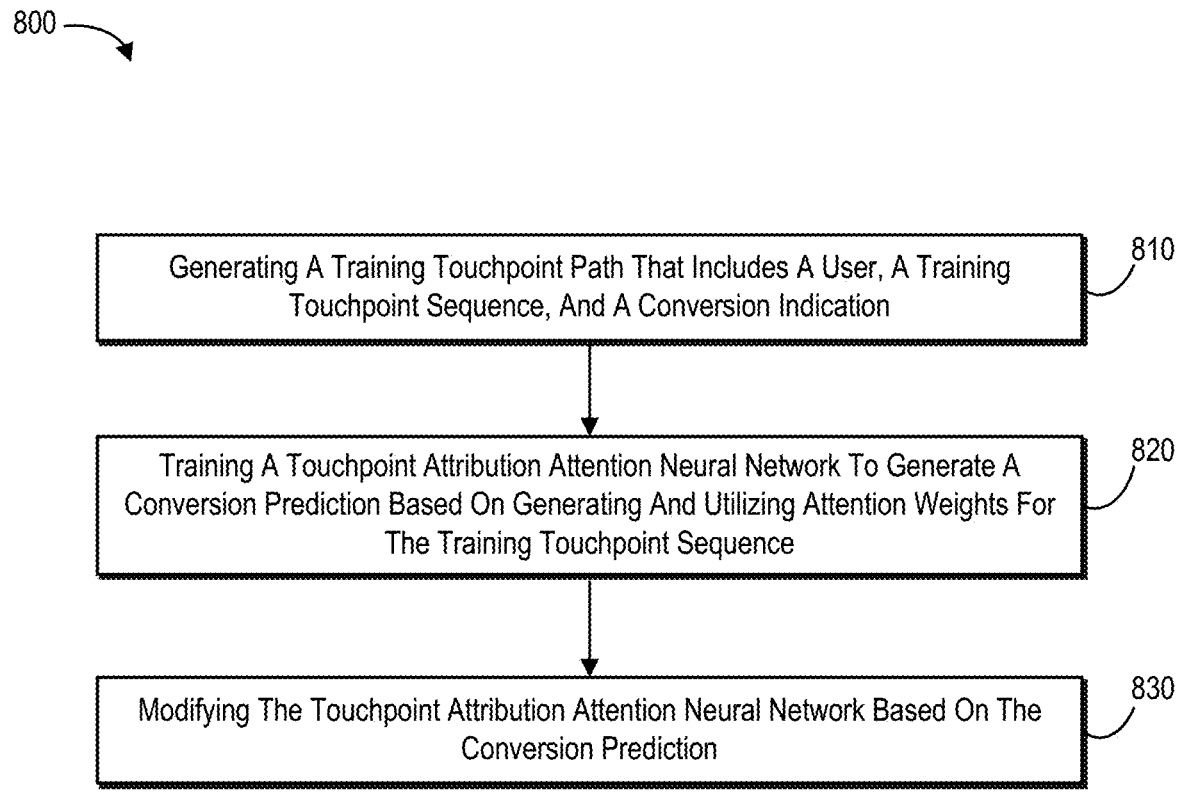
FIG. 8 illustrates a flowchart of a series of acts for training a touchpoint attribution attention neural network in accordance with one or more embodiments.
Figure 9:
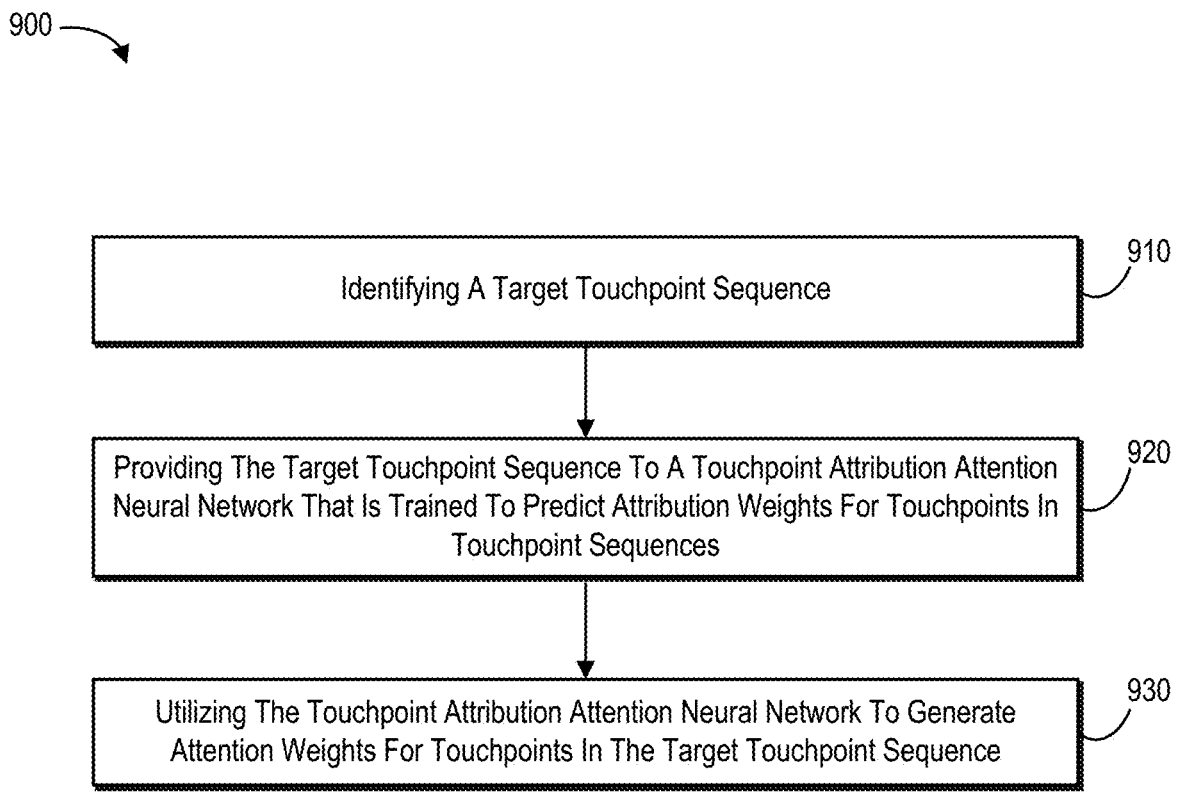
FIG. 9 illustrates a flowchart of a series of acts for utilizing a trained touchpoint attribution attention neural network to generate touchpoint attributions in accordance with one or more embodiments.

FIGS. 1-8, the corresponding text, and the examples provide a number of different methods, systems, devices, and non-transitory computer-readable media of the deep learning attribution system 104. In addition to the foregoing, one or more embodiments can also be described in terms of flowcharts comprising acts for accomplishing a particular result, as shown in FIG. 8 and FIG. 9. FIG. 8 and FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for training a touchpoint attribution attention neural network in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

In one or more embodiments, the series of acts 800 is implemented on one or more computing devices, such as the computing device 700 or the server device 101. In addition, in some embodiments, the series of acts 800 is implemented in a digital environment for distributing electronic content across computing devices utilizing a plurality of digital media channels. For example, the series of acts 800 is implemented on a computing device having memory that stores digital training touchpoints and digital training conversions corresponding to a set of users. In additional embodiments, the computing device also stores a touchpoint attribute attention neural network that includes an encoding layer, an LSTM layer, a touchpoint attention layer, and a classification layer.

The series of acts 800 includes an act 810 of generating a training touchpoint path that includes a user, a training touchpoint sequence, and a conversion indication. In particular, the act 810 can involve generating a first training touchpoint path including a first user of the set of users, a first training touchpoint sequence from the digital training touchpoints, and a first conversion indication from the training conversions. In some embodiments, the act 810 includes identifying a set of digital training touchpoints and a set of digital training conversions corresponding to a set of users. In one or more embodiments, the first conversion indicator in the first training touchpoint path includes a positive conversion indication or a negative conversion indication.

The series of acts 800 includes an act 820 of training a touchpoint attribution attention neural network to generate a conversion prediction based on generating and utilizing attention weights for the training touchpoint sequence. In particular, the act 820 can involve training the touchpoint attribution attention neural network to generate digital touchpoint predictions by generating attention weights for the first training touchpoint sequence, utilizing the encoding layer, the LSTM layer, and the touchpoint attention layer, utilizing the classification layer to generate a conversion prediction for the first training touchpoint sequence based on the attention weights, and modifying parameters of the touchpoint attribution attention neural network by comparing the conversion prediction for the first training touchpoint sequence and the first conversion indication.

In one or more embodiments, the act 820 includes applying, for a first touchpoint in the first training touchpoint sequence, a time-decay parameter to obtain a time-decayed attention weight for the first touchpoint, wherein the time-decay parameter is based on an elapsed time between a first time of the first touchpoint and an end time of the first training touchpoint path.

In various embodiments, the touchpoint attribution attention neural network further includes a user bias control machine-learning model. In these embodiments, the act 820 can include training the touchpoint attribution attention neural network by providing time-independent control variables to the user bias control machine-learning model, utilizing the user bias control machine-learning model to generate a user bias control vector, and generating the conversion prediction based on the attention weights and the user bias control vector. The act 820, in some embodiments, includes identifying a positive conversion indication associated with the digital target touchpoint sequence that indicates a conversion (e.g., the first conversion indication), where generating attention weights is based on the first training touchpoint sequence being associated with the conversion.

As shown, the series of acts also includes an act 830 of modifying the touchpoint attribution attention neural network based on the conversion prediction. The act 830 can include modifying parameters of the touchpoint attribution attention neural network based on a comparison between the conversion prediction for the first training touchpoint sequence and the first conversion indication. In one or more embodiments, comparing the conversion prediction for the first training touchpoint sequence and the first conversion indication includes utilizing a loss function to determine a training loss based on the conversion prediction and the first conversion indication, and modifying the touchpoint attention layer based on the training loss.

In additional embodiments, the act 820 includes training the user bias control machine-learning model and the touchpoint attention layer by providing, from the user bias control machine-learning model, a user bias control representation to the classification layer of the touchpoint attribution attention neural network, and providing, from the touchpoint attention layer, a touchpoint sequence representation to the classification layer of the touchpoint attribution attention neural network. In further embodiments, the act 820 also includes training the user bias control machine-learning model and the touchpoint attention layer by utilizing the classification layer to generate a classification prediction based on the user bias control representation and the touchpoint sequence representation, and training the user bias control machine-learning model and the touchpoint attention layer by comparing the classification prediction and the first conversion indication.

As mentioned previously, FIG. 9 illustrates a flowchart of a series of acts generating touchpoint attributions utilizing a trained touchpoint attribution attention neural network in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In one or more embodiments, a system can perform the acts of FIG. 9. In some embodiments, the series of acts 900 is implemented by a computing system on one or more computing devices, such as the computing device 700 or the server device 101.

As shown, the series of acts 900 includes an act 910 of identifying a target touchpoint sequence. In particular, the act 910 can involve identifying a digital target touchpoint sequence of a target user. In one or more embodiments, the digital target touchpoint sequence includes timestamp data corresponding to each touchpoint. In some embodiments, the digital target touchpoint sequence is associated with a conversion indication, which indicates that the digital target touchpoint sequence ended with a conversion represented by a conversion timestamp. In various embodiments, the act 910 also includes identifying profile attributes and characteristics associated with the target user.

In addition, the series of acts 900 includes an act 920 of providing the target touchpoint sequence to a touchpoint attribution attention neural network that is trained to predict attention weights for touchpoints in touchpoint sequences. In particular, the act 920 can involve providing the digital target touchpoint sequence to a touchpoint attribution attention neural network that includes an encoding layer, an LSTM layer, and a touchpoint attention layer. Further, the touchpoint attribution attention neural network is trained based on a plurality of digital training touchpoints and a plurality of training conversion indications to predict attention weights for touchpoints in digital touchpoint sequences.

The series of acts 900 also includes an act 930 of utilizing the touchpoint attribution attention neural network to generate attention weights for touchpoints in the target touchpoint sequence. In particular, the act 930 can involve utilizing the touchpoint attribution attention neural network to generate attention weights for digital touchpoints in the digital target touchpoint sequence, where the attention weights reflect relative conversion significance of each digital touchpoint in the digital target touchpoint sequence.

The series of acts 900 can also include additional acts. For example, in one or more embodiments, the series of acts 900 includes the act of generating a first attention weight for a first digital touchpoint in the digital target touchpoint sequence by determining a time-decay parameter for a first digital touchpoint. In some embodiments, the touchpoint attribution attention neural network is trained further based on a user bias control machine-learning model that jointly learns with the encoding layer, the LSTM layer, and the touchpoint attention layer.

In various embodiments, the series of acts 900 includes the act of identifying a positive conversion indication associated with the digital target touchpoint sequence that indicates a conversion corresponding to the digital target touchpoint sequence. In addition, the series of acts 900 includes the act of provide, for display, a first digital touchpoint in the digital target touchpoint sequence and a first attention-based score for the first digital touchpoint to a graphical user interface of an administrator client device based on the conversion corresponding to the digital target touchpoint sequence.

In one or more embodiments, the series of acts 900 includes the acts of generating a digital conversion prediction based on the attention weights for the digital touchpoints in the digital target touchpoint sequence utilizing a classification layer of the touchpoint attribution attention neural network as well as providing digital content to a client device of the target user based on the digital conversion prediction. In some embodiments, generating the digital conversion prediction includes aggregating hidden touchpoint features of the digital target touchpoint sequence and attention weights for the digital touchpoints in the digital target touchpoint sequence to generate the digital conversion prediction.

In additional embodiments, the series of acts 900 includes the acts of generating a digital conversion prediction corresponding to a digital media channel for the target user based on the attention weights for the digital touchpoints in the digital target touchpoint sequence, generating a digital content campaign that includes the target user and the digital media channel based on the digital conversion prediction, and executing the digital content campaign by providing digital content via the digital media channel to a client device of the target user.

Further, in one or more embodiments, the series of acts 900 can include the act of generating a digital conversion prediction for providing digital content to a client device of a target user, where the conversion prediction includes the conversion probability of adding a potential touchpoint to the target touchpoint sequence, the potential touchpoint corresponding to a first media channel. In additional embodiments, the series of acts 900 includes the acts of utilizing the trained touchpoint attribution attention neural network to generate a second conversion probability based on adding a second potential touchpoint to the target touchpoint sequence, the second potential touchpoint corresponding to a second media channel as well as providing digital content via the first media channel to the client device of the target user based on determining that the first conversion probability is greater than the second conversion probability.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
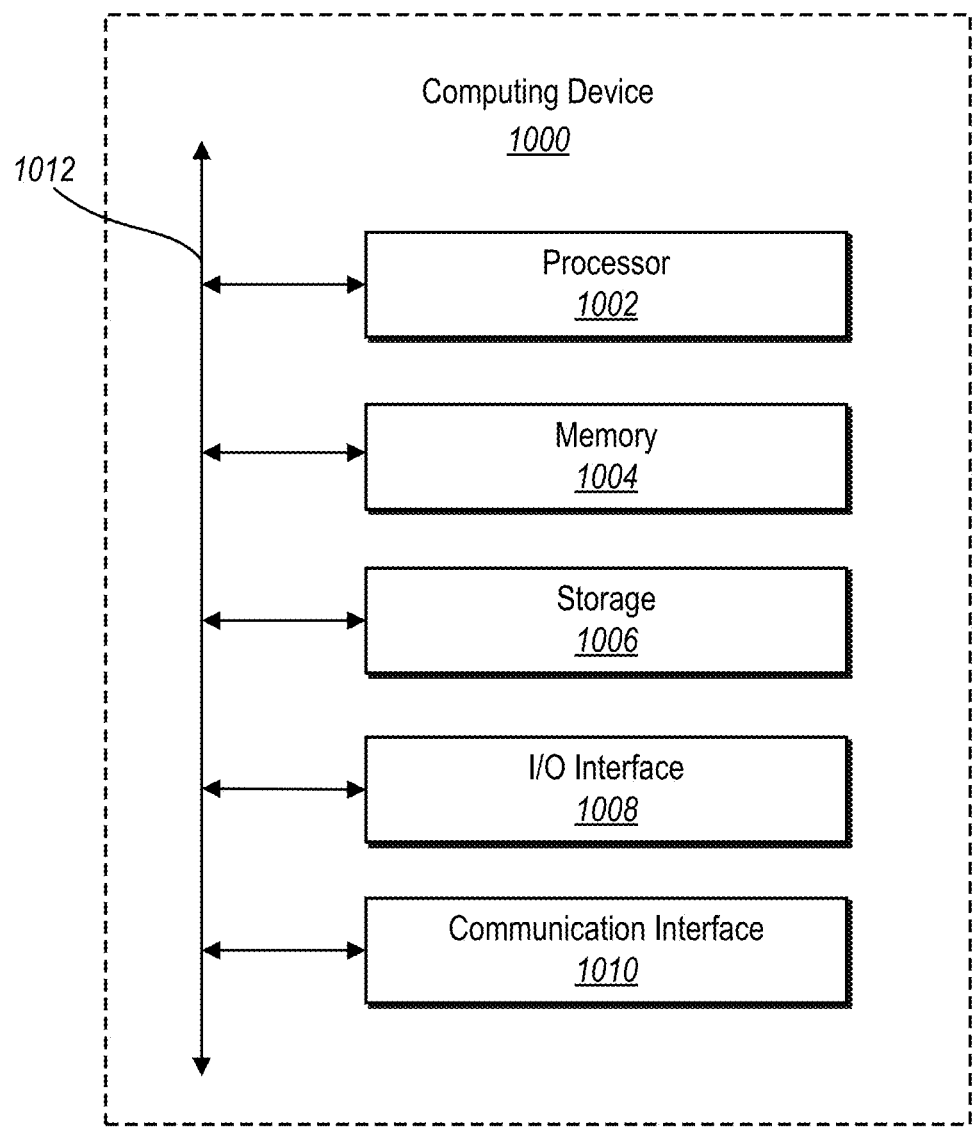
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 700, server device 101, 114, and client devices 108, 112a-b, 600). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital environment for distributing electronic content across computing devices utilizing a plurality of digital media channels, a computer-implemented method for utilizing machine-learned attribution models to generate accurate attribution for individual touchpoints in digital content campaigns, the computer-implemented method comprising:
    generating a digital target touchpoint path of a target user, the digital target touchpoint path comprising a digital target touchpoint sequence of digital touchpoints and a positive conversion indicator; and
    based on identifying the positive conversion indicator, generating target attention weights for the digital touchpoints in the digital target touchpoint sequence utilizing a touchpoint attribution attention neural network by:
        generating an encoded touchpoint vector encoding the digital target touchpoint path via an encoding layer of the touchpoint attribution attention neural network;
        determining a hidden state vector via a long short-term memory (LSTM) layer of the touchpoint attribution attention neural network from the encoded touchpoint vector, wherein the hidden state vector comprises historical contextual information of the digital target touchpoint sequence; and
        generating the target attention weights from the hidden state vector via a touchpoint attention layer of the touchpoint attribution attention neural network that determines attention weights for a touch point sequence based on touchpoints and an order of the touchpoints in the touch point sequence, wherein the target attention weights comprise attention coefficient values that indicate attribution levels for each of the digital touchpoints in the digital target touchpoint sequence.

2. The computer-implemented method of claim 1, further comprising:
    determining a time-decay parameter for a first digital touchpoint of the digital target touchpoint path, wherein the time-decay parameter is based on an elapsed time between a first time of the first digital touchpoint and an end time of the digital target touchpoint path; and
    generating an attention weight for the first digital touchpoint utilizing the touchpoint attention layer within the touchpoint attribution attention neural network by applying a time-decayed attention weight for the first digital touchpoint based on the time-decay parameter.

3. The computer-implemented method of claim 1, further comprising:
    jointly training a user bias control machine-learning model and the touchpoint attention layer within the touchpoint attribution attention neural network; and
    generating the target attention weights of the digital touchpoints in the digital target touchpoint path utilizing the touchpoint attention layer jointly trained with the user bias control machine-learning model.

4. The computer-implemented method of claim 1, further comprising utilizing a touchpoint context vector and hidden state vectors within the touchpoint attention layer of the touchpoint attribution attention neural network to generate the target attention weights for the digital target touchpoint sequence, wherein the touchpoint context vector is a high-level representation of a fixed sequence of digital touchpoints that biases one or more digital touchpoints in the digital target touchpoint sequence; and
    wherein the target attention weights for each of digital touchpoints the digital target touchpoint sequence are relative to the other digital touchpoints in the digital target touchpoint sequence.

5. The computer-implemented method of claim 4, further comprising training the touchpoint attribution attention neural network by:
    utilizing a plurality of digital training touchpoint paths to generate attention weights of digital touchpoints in digital training touchpoint sequences corresponding to the plurality of digital training touchpoint paths;
    generating a digital touchpoint sequence representation of a digital training touchpoint sequence by combining attention weights of digital touchpoints in the digital training touchpoint sequence weighted with corresponding hidden state vectors; and tuning the touchpoint attention layer based on comparing the digital touchpoint sequence representation with a corresponding digital training conversion.

6. A non-transitory computer-readable medium storing instructions that, when executed by at least one processor, cause a computer system to:

identify a digital target touchpoint sequence of a target user;

generate a plurality of digital target touchpoint sequences by:
- appending a first potential touchpoint to the digital target touchpoint sequence to generate a first digital target touchpoint sequence; and
- appending a second potential touchpoint to the digital target touchpoint sequence to generate a second digital target touchpoint sequence;

generate target attention weights for digital touchpoints in the plurality of digital target touchpoint sequences utilizing a touchpoint attribution attention neural network by:
- generating encoded touchpoint vectors by encoding the digital target touchpoint sequences via an encoding layer of the touchpoint attribution attention neural network;
- determining hidden state vectors via a long short-term memory (LSTM) layer of the touchpoint attribution attention neural network from the encoded touchpoint vectors, wherein the hidden state vectors comprise historical contextual information of the digital target touchpoint sequences; and
- generating the target attention weights from the hidden state vectors via a touchpoint attention layer of the touchpoint attribution attention neural network that determines attention weights for touch point sequences based on touchpoints and an order of the touchpoints in the touch point sequences, wherein the target attention weights comprise attention coefficient values that indicate attribution levels for each of the digital touchpoints in the digital target touchpoint sequences;

identify digital conversion prediction scores from the target attention weights of the digital touchpoints in the plurality of digital target touchpoint sequences utilizing the touchpoint attribution attention neural network;

select the first potential touchpoint for distributing digital content based on determining that a first conversion prediction score for the first digital target touchpoint sequence indicates a greater likelihood of conversion than and a second conversion prediction score for the second digital target touchpoint sequence.

7. The computer-readable medium of claim 6, further comprising instructions that, when executed by the at least one processor, cause the computer system to generate a first attention weight for a first digital touchpoint in the first digital target touchpoint sequence by determining a time-decay parameter for the first digital touchpoint, wherein the time-decay parameter is based on an elapsed time between a first time of the first digital touchpoint and an end time of the first digital target touchpoint sequence.

8. The computer-readable medium of claim 6, wherein the touchpoint attribution attention neural network comprises a user bias control machine-learning model; and further comprising instructions that, when executed by the at least one processor, cause the computer system to jointly train the user bias control machine-learning model with the encoding layer, the LSTM layer, and the touchpoint attention layer.

9. The computer-readable medium of claim 6, further comprising instructions that, when executed by the at least one processor, cause the computer system to:

identify a positive conversion indication associated with the first digital target touchpoint sequence; and provide, for display to a graphical user interface of an administrator client device based on the positive conversion indication associated with the first digital target touchpoint sequence, the first potential touchpoint in the first digital target touchpoint sequence and a first attention-based score for the first potential touchpoint.

10. The computer-readable medium of claim 6, further comprising instructions that, when executed by the at least one processor, cause the computer system to generate the digital conversion prediction scores utilizing the target attention weights of the digital touchpoints in the plurality of digital target touchpoint sequences utilizing a classification layer of the touchpoint attribution attention neural network.

11. The computer-readable medium of claim 10, further comprising instructions that, when executed by the at least one processor, cause the computer system to generate the digital conversion prediction scores utilizing the digital touchpoints in the plurality of digital target touchpoint sequences by aggregating hidden touchpoint features of the plurality of digital target touchpoint sequences and target attention weights for the digital touchpoints in the plurality of digital target touchpoint sequences to generate the digital conversion prediction scores; and wherein the target attention weights for each of digital touchpoints the digital target touchpoint sequence are relative to the other digital touchpoints in the digital target touchpoint sequence.

12. The computer-readable medium of claim 10, wherein the first potential touchpoint corresponds to a digital media channel; and further comprising instructions that, when executed by the at least one processor, cause the computer system to provide the digital content to a client device of the target user utilizing the digital media channel.

13. The computer-readable medium of claim 12, wherein the touchpoint attribution attention neural network comprises an embedding layer that categorizes hidden contextual similarities between the touchpoints in the first digital target touchpoint sequence.

14. The computer-readable medium of claim 6, further comprising instructions that, when executed by the at least one processor, cause the computer system to:

generate, based on the digital conversion prediction scores, a digital content campaign that comprises the target user and a digital media channel associated with the first potential touchpoint; and execute the digital content campaign by providing the digital content via the digital media channel to a client device of the target user.

15. A system comprising:

a memory comprising:
- digital touchpoints and digital conversions corresponding to a set of users; and
- a touchpoint attribution attention neural network comprising an encoding layer that determines attention weights for a touch point sequence based on touchpoints and an order of the touchpoints in the touch point sequence, a long short-term memory (LSTM) layer, a touchpoint attention layer, and a classification layer;

at least one processor; and at least one non-transitory computer-readable storage medium storing instructions that, when executed by the at least one processor, cause the system to:

generate a first touchpoint path comprising a first user of the set of users, a first touchpoint sequence from the digital touchpoints, and a first conversion indication from the digital conversions; and generate digital touchpoint predictions utilizing the touchpoint attribution attention neural network by:

generating attention weights for the first touchpoint sequence utilizing the encoding layer to generate an encoded touchpoint vector from the first touchpoint sequence, the LSTM layer to determine a hidden state vector that comprises historical contextual information of the first touchpoint sequence from the encoded touchpoint vector, and the touchpoint attention layer to generate the attention weights from the hidden state vector, wherein the attention weights comprise attention coefficient values that indicate attribution levels for each of the digital touchpoints in the first touchpoint sequence; and utilizing the classification layer to generate a conversion prediction for the first touchpoint sequence based on the attention weights.

16. The system of claim 15, wherein generating the attention weights for the first touchpoint sequence utilizing the encoding layer, the LSTM layer, and the touchpoint attention layer further comprises applying, for a first touchpoint in the first touchpoint sequence, a time-decay parameter to obtain a time-decayed attention weight for the first touchpoint, wherein the time-decay parameter is based on an elapsed time between a first time of the first touchpoint and an end time of the first touchpoint path.

17. The system of claim 15, wherein the touchpoint attribution attention neural network further comprises a user bias control machine-learning model; and the system further comprises instructions that, when executed by the at least one processor, cause the system to train the touchpoint attribution attention neural network by:

providing control variables to the user bias control machine-learning model;

utilizing the user bias control machine-learning model to generate a user bias control vector; and generating a conversion prediction of a training touchpoint path based on attention weights generated during training and the user bias control vector.

18. The system of claim 17, further comprises instructions that, when executed by the at least one processor, cause the system to jointly train the user bias control machine-learning model and the touchpoint attention layer by:

providing, from the user bias control machine-learning model, a user bias control representation to the classification layer of the touchpoint attribution attention neural network; and providing, from the touchpoint attention layer, a touchpoint sequence representation of the training touchpoint path to the classification layer of the touchpoint attribution attention neural network.

19. The system of claim 18, further comprises instructions that, when executed by the at least one processor, cause the system to jointly train the user bias control machine-learning model and the touchpoint attention layer by:

utilizing the classification layer to generate a classification prediction of the training touchpoint path based on the user bias control representation and the touchpoint sequence representation of the training touchpoint path; and training the user bias control machine-learning model and the touchpoint attention layer by comparing the classification prediction and a conversion indication of the training touchpoint path.

20. The system of claim 19, wherein comparing the conversion prediction for the training touchpoint path comprising a touchpoint sequence and the conversion indication comprises:

utilizing a loss function to determine a training loss based on the conversion prediction and the conversion indication; and modifying the touchpoint attention layer based on the training loss.

* * * * *